United States Patent
Otake et al.

(10) Patent No.: US 10,990,262 B2
(45) Date of Patent: Apr. 27, 2021

(54) DISPLAY SCREEN GENERATION APPARATUS, FACTORY AUTOMATION SYSTEM, AND DISPLAY SCREEN GENERATION METHOD

(71) Applicant: Mitsubishi Electric Corporation, Tokyo (JP)

(72) Inventors: Yuya Otake, Tokyo (JP); Tsuyoshi Kobayashi, Tokyo (JP); Miya Inoue, Tokyo (JP); Ryota Hashimoto, Tokyo (JP); Naoki Yasue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/487,641

(22) PCT Filed: Apr. 13, 2017

(86) PCT No.: PCT/JP2017/015136
§ 371 (c)(1),
(2) Date: Aug. 21, 2019

(87) PCT Pub. No.: WO2018/189864
PCT Pub. Date: Oct. 18, 2018

(65) Prior Publication Data
US 2020/0064992 A1    Feb. 27, 2020

(51) Int. Cl.
*G06F 3/0484* (2013.01)
*G05B 19/05* (2006.01)
(Continued)

(52) U.S. Cl.
CPC ....... *G06F 3/04847* (2013.01); *G05B 19/054* (2013.01); *G06F 3/0482* (2013.01);
(Continued)

(58) Field of Classification Search
None
See application file for complete search history.

(56) References Cited

U.S. PATENT DOCUMENTS 6,421,571 B1  7/2002 Spriggs et al.
6,799,080 B1 * 9/2004 Hylden ............... G05B 19/409
340/3.1
(Continued)

FOREIGN PATENT DOCUMENTS

DE    10 2014 103 442 A1    9/2014
DE    11 2014 007 254 T5    9/2017
(Continued)

OTHER PUBLICATIONS

Korean Office Action for Korean Application No. 10-2019-7029365, dated Feb. 12, 2020, with English translation.
(Continued)

*Primary Examiner* — Amy M Levy
(74) *Attorney, Agent, or Firm* — Birch, Stewart, Kolasch & Birch, LLP

(57) ABSTRACT

A display apparatus (101) includes an input unit (220); a communication unit (250); a display unit (210); and a control unit (240) including a display content setting unit (244), a layout setting unit (245) for setting a screen layout, and a screen generation unit (246) for generating a display screen based on the display content, the screen layout, and information acquired via the communication unit (250) and concerning the PLC. The display content setting unit (244) displays a candidate list of a display item based on at least one of: network configuration information (231) of equipments (103) and a PLC (102) which is created in advance, an equipment information file (232), and device allocation information (233) of the equipments (103) and the PLC (102), to the display unit, and sets display content based on input information coming from the input unit (220). The
(Continued)

display apparatus can thus generate a display screen for an FA system based on information shared with another apparatus, as information concerning an equipment which is information other than screen configuration information.

9 Claims, 26 Drawing Sheets

(51) Int. Cl.
*G06F 3/0482* (2013.01)
*G06F 3/14* (2006.01)

(52) U.S. Cl.
CPC ...... *G06F 3/14* (2013.01); *G05B 2219/15123* (2013.01); *G06F 2203/04803* (2013.01)

(56) References Cited

U.S. PATENT DOCUMENTS

| | | | | |
|---|---|---|---|---|
| 7,124,397 | B1* | 10/2006 | Mathur | G06F 1/3203 717/101 |
| 7,533,347 | B2* | 5/2009 | Santori | G06F 8/34 715/762 |
| 7,624,375 | B2* | 11/2009 | Santori | G06F 8/38 715/717 |
| 2002/0118225 | A1 | 8/2002 | Miksovsky | |
| 2003/0023518 | A1 | 1/2003 | Spriggs et al. | |
| 2003/0028269 | A1 | 2/2003 | Spriggs et al. | |
| 2004/0139079 | A1 | 7/2004 | Eryurek et al. | |
| 2004/0139085 | A1 | 7/2004 | Eryurek et al. | |
| 2004/0210419 | A1* | 10/2004 | Wiebe | F25B 49/005 702/182 |
| 2005/0066280 | A1* | 3/2005 | Austin | G06F 3/0481 715/733 |
| 2007/0260432 | A1* | 11/2007 | Okada | G06F 30/13 703/1 |
| 2008/0077512 | A1* | 3/2008 | Grewal | G06F 16/29 705/28 |
| 2008/0154399 | A1 | 6/2008 | Kaneko et al. | |
| 2012/0060091 | A1* | 3/2012 | Ueno | G06F 3/0481 715/705 |
| 2014/0277617 | A1 | 9/2014 | Nixon et al. | |
| 2015/0220076 | A1* | 8/2015 | Uchida | G05B 19/042 700/97 |
| 2016/0306345 | A1 | 10/2016 | Idota | |
| 2017/0262436 | A1 | 9/2017 | Uchida | |
| 2020/0133473 | A1* | 4/2020 | Coble | G06F 8/38 |

FOREIGN PATENT DOCUMENTS

| | | |
|---|---|---|
| DE | 103 94 010 B4 | 12/2017 |
| GB | 2513707 A | 5/2014 |
| JP | 11-102290 A | 4/1999 |
| JP | 11-161587 A | 6/1999 |
| JP | 2000-47777 A | 2/2000 |
| JP | 2003-15874 A | 1/2003 |
| JP | 2003-525489 A | 8/2003 |
| JP | 2005-56098 A | 3/2005 |
| JP | 2005-346432 A | 12/2005 |
| JP | 2006-72396 A | 3/2006 |
| JP | 2008-159002 A | 7/2008 |
| JP | 2012-8893 A | 1/2012 |
| JP | 2014-102601 A | 6/2014 |
| JP | 2016-62424 A | 4/2016 |
| KR | 10-2015-0048184 A | 5/2015 |
| TW | 200911674 A | 3/2009 |
| TW | 201527914 A | 7/2015 |
| WO | WO 2009/010970 A2 | 1/2009 |
| WO | WO 2016/098168 A1 | 6/2016 |

OTHER PUBLICATIONS

International Search Report for International Application No. PCT/JP2017/015136, dated Jul. 18, 2017.
Japanese Office Action for Japanese Application No. 2017-554545, dated Apr. 10, 2018, with English translation.
Taiwanese Office Action and Search Report for Taiwanese Application No. 106120539, dated Oct. 16, 2018, with partial English translation.
Office Action dated Oct. 27, 2020 in corresponding German Application No. 11 2017 007 222.0.

* cited by examiner

Fig.4A

| ITEM NAME | PRESENT VALUE |
|---|---|
| | |
| | |
| | |
| | |
| | |
| | |

EQUIPMENT○

Fig.4B

EQUIPMENT○     UPDATE INFORMATION

| OPERATION INFORMATION | | |
|---|---|---|
| CODE | ERROR NAME | |
| | | EXPLAIN |

Fig.9C

| EQUIPMENT 103a | |
|---|---|
| ITEM NAME | PRESENT VALUE |
| FIRST MONITOR VALUE | 120 |
| SECOND MONITOR VALUE | 200 |

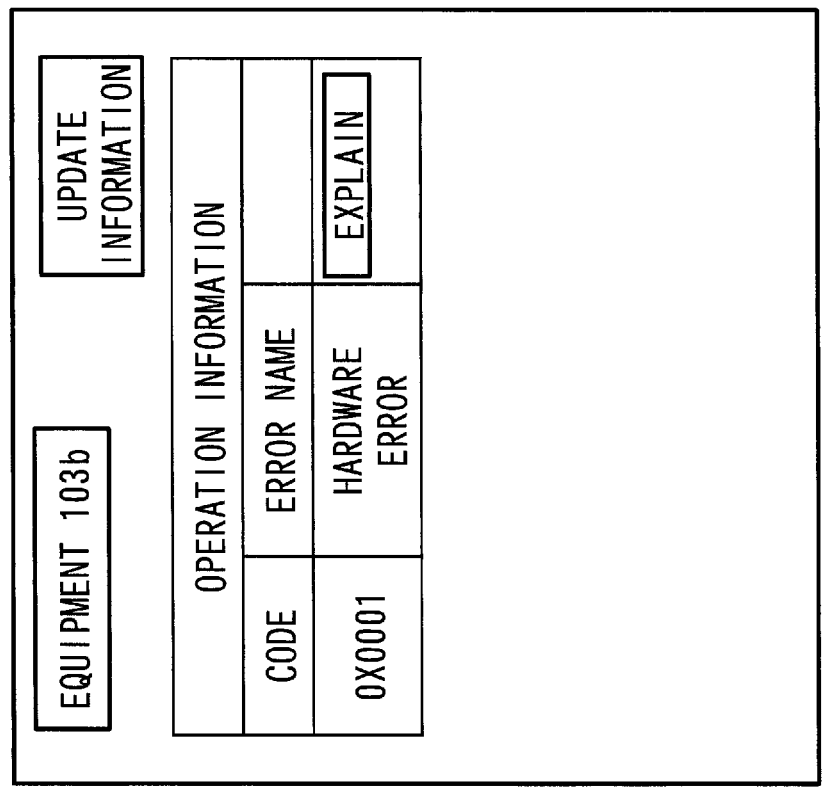

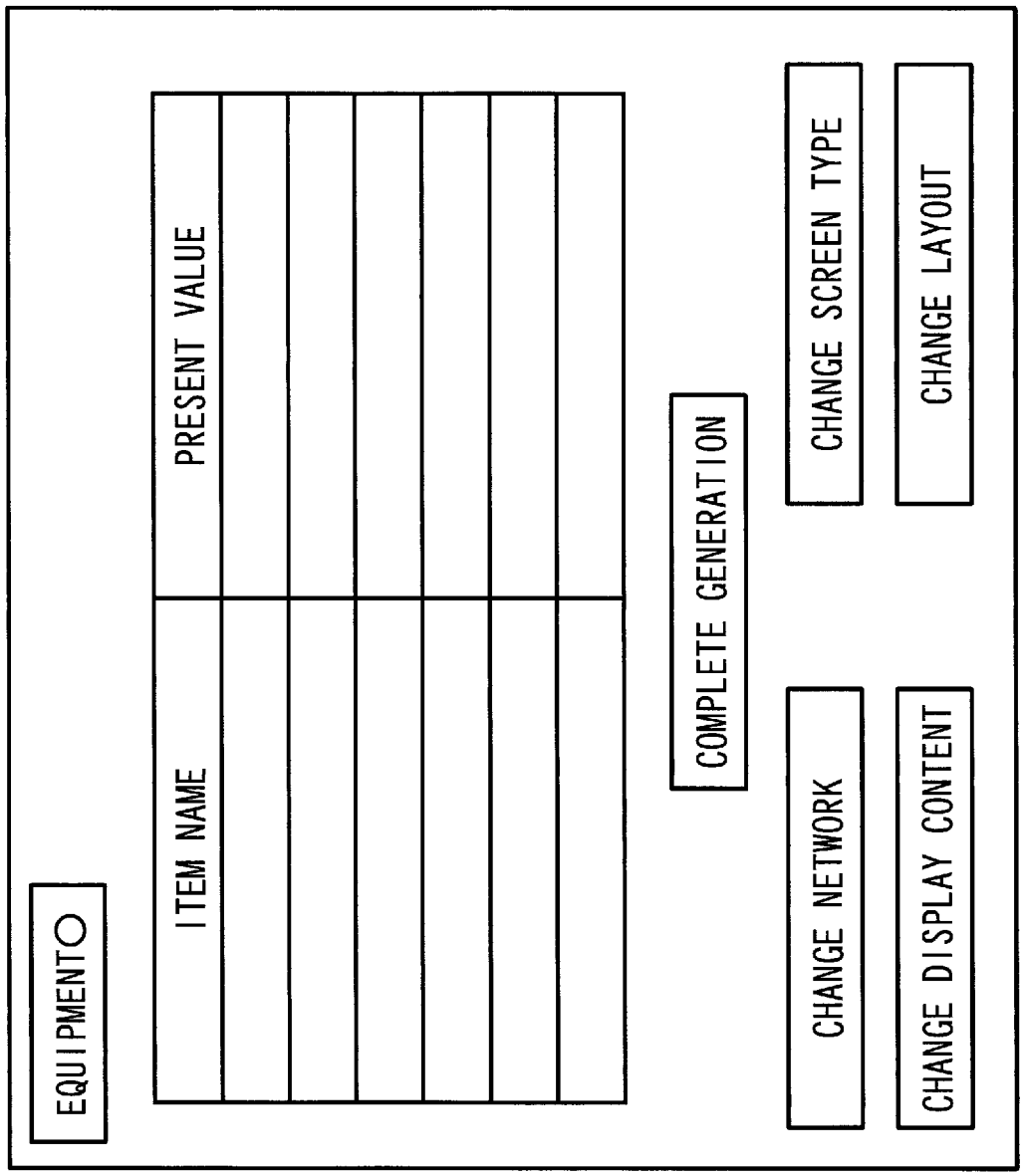

Fig. 14C

| EQUIPMENT 103a | |
|---|---|
| ITEM NAME | PRESENT VALUE |
| FIRST MONITOR VALUE | 120 |
| SECOND MONITOR VALUE | 200 |

| EQUIPMENT 103b | |
|---|---|
| ITEM NAME | PRESENT VALUE |
| FIRST MONITOR VALUE | 24 |
| SECOND MONITOR VALUE | 888 |

Fig.19A

```
☐□ EQUIPMENT 103a              [ RESET ]
   ☐□ INPUT/OUTPUT
      ☐□ SWITCH 1
      ☐□ SWITCH 2
      ☐☑ FIRST MONITOR VALUE
      ☐☑ SECOND MONITOR VALUE
      ☐□ ANSWER CODE
      ☐□ READ DATA
   ⊞□ PARAMETER

☐□ EQUIPMENT 103b
   ☐□ INPUT/OUTPUT
      ☐■ FIRST MONITOR VALUE
      ☐■ SECOND MONITOR VALUE
   ⊞□ PARAMETER

⊞□ EQUIPMENT 103c
```

Fig.19B

```
☐□ EQUIPMENT 103a              [ RESET ]
   ☐□ INPUT/OUTPUT
      ☐□ SWITCH 1
      ☐□ SWITCH 2
      ☐   FIRST MONITOR VALUE
      ☐   SECOND MONITOR VALUE
      ☐□ ANSWER CODE
      ☐□ READ DATA
   ⊞□ PARAMETER

☐□ EQUIPMENT 103b
   ☐□ INPUT/OUTPUT
      ☐■ FIRST MONITOR VALUE
      ☐■ SECOND MONITOR VALUE
   ⊞□ PARAMETER

⊞□ EQUIPMENT 103c
```

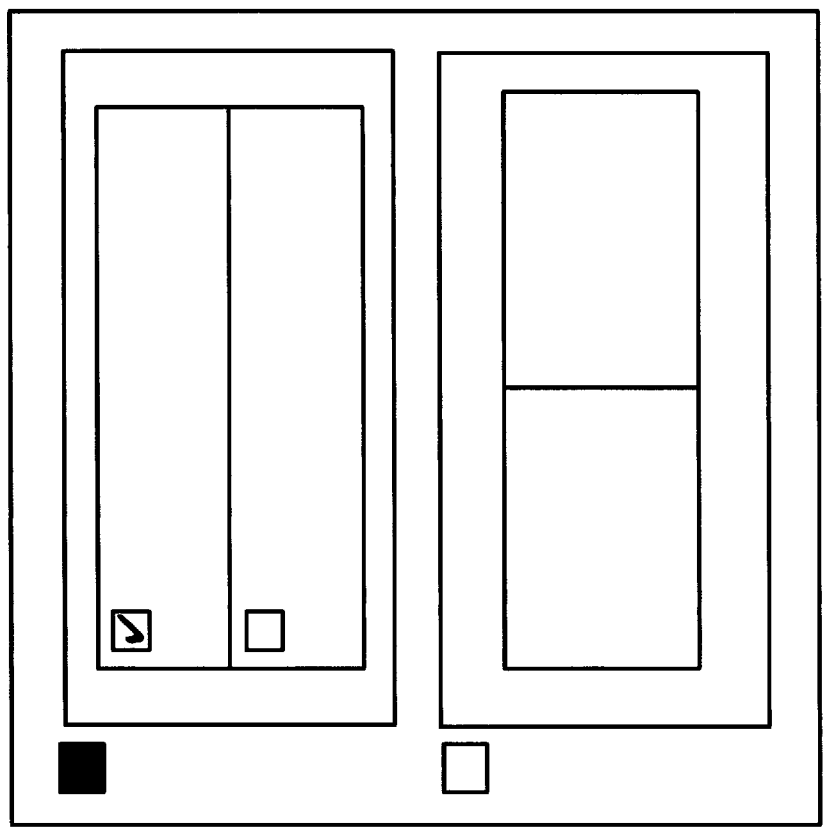

DISPLAY SCREEN GENERATION APPARATUS, FACTORY AUTOMATION SYSTEM, AND DISPLAY SCREEN GENERATION METHOD

TECHNICAL FIELD

The present invention relates to a display screen generation apparatus for generating various types of screens related to connected equipments in a factory automation (to be abbreviated as FA hereinafter) system.

BACKGROUND ART

In recent years, the development man-hours of FA systems have been increasing due to the enlargement of the system. In such a situation, a display screen of a display screen generation apparatus for an FA system is becoming complicated, and the work of creating this display screen increases the development man-hours, which is a burden on the user.

CITATION LIST

In order to solve the above-described problems, Patent Literature 1 proposes a screen generation method of automatically generating a setting screen of a target equipment based on an equipment profile, screen display message information, and screen configuration information.

Patent Literature

Patent Literature 1: JP 2006-72396 A (FIG. 1)

SUMMARY OF INVENTION

Technical Problem

However, in a screen generation method of Patent Literature 1, an equipment profile and screen display message information as the basis of an automatically generated display screen must be information that are created for the display screen and that cannot be shared with another apparatus. In a factory where a large number of equipments operate, there has been a problem that the development man-hours increase due to creating information for this display screen.

The present invention has been made to solve the above-mentioned problems, and has as its objective to realize a display screen generation apparatus capable of generating a display screen for an FA system based on information shared with another apparatus, as information on an equipment which is information other than screen configuration information.

Solution to Problem

In order to solve the above problems and to achieve the above objective, a display screen generation apparatus according to the present invention is a display screen generation apparatus connected to a programmable logic controller (PLC) to which a plurality of equipments are connected. The display screen generation apparatus includes:

an input unit to accept input from a user;
a communication unit to execute communication with the PLC;
a display unit to display a screen; and
a control unit including a display content setting unit, a layout setting unit, and a screen generation unit, the display content setting unit displaying a display content setting screen including a candidate list of a display item based on at least one of network configuration information, an equipment information file, and device allocation information to the display unit, and setting display content based on input information coming from the input unit, the network configuration information being created in advance and concerning a network configuration of the plurality of equipments and the PLC, the equipment information file concerning the plurality of equipments, the device allocation information concerning a device allocation of the plurality of equipments and the PLC, the layout setting unit displaying a layout setting screen including a candidate list of a screen layout to the display unit and setting a screen layout based on the input information coming from the input unit, the screen generation unit generating a display screen based on the display content which is set by the display content setting unit, the screen layout which is set by the layout setting unit, and information which is acquired via the communication unit and which concerns the PLC.

Advantageous Effects of Invention

With a display screen generation apparatus according to the present invention, because of the above-described configuration, a display screen for an FA system can be generated based on information shared with another apparatus, as the information on an equipment which is information other than screen configuration information.

BRIEF DESCRIPTION OF DRAWINGS

FIGS. 4A, 4B, and 4C present explanatory diagrams each illustrating an example of a screen frame corresponding to a screen type in Embodiment 1 of the present invention.

FIGS. 9A, 9B, and 9C present explanatory diagrams each illustrating an example of a display screen of a case in Embodiment 1 of the present invention where a screen type is an input/output information screen.

FIGS. 10A, 10B, and 10C present explanatory diagrams each illustrating an example of a display screen of a case in Embodiment 1 of the present invention where the screen type is an operation information screen.

FIG. 12 is an explanatory diagram illustrating an example of a confirmation screen in Embodiment 1 of the present invention.

FIGS. 14A, 14B, and 14C present explanatory diagrams each illustrating an example of the display screen in Embodiment 1 of the present invention.

FIGS. 19A and 19B present explanatory diagrams each illustrating an example of a display content setting screen of the second setting and beyond in Embodiment 3 of the present invention.

FIG. 20 is an explanatory drawing illustrating an example of a layout setting screen in Embodiment 3 of the present invention.

Figure 1:
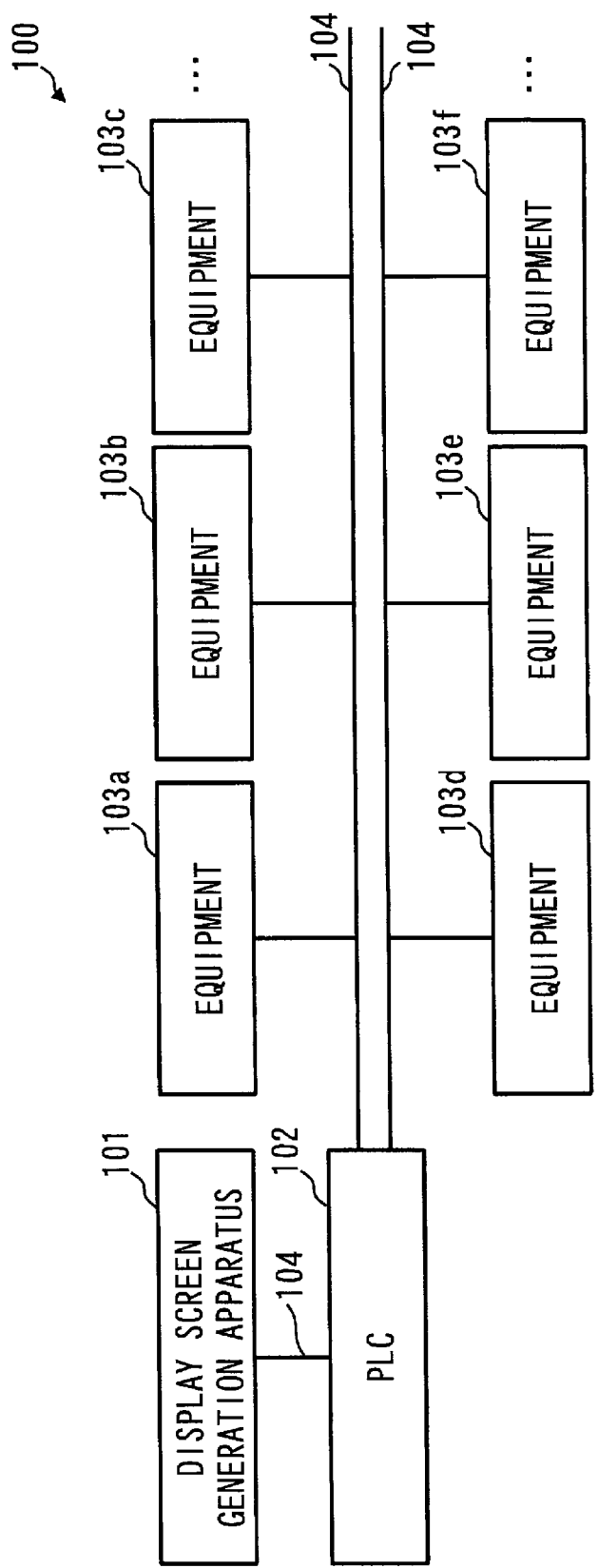
FIG. 1 is a configuration diagram illustrating an example of an FA system in Embodiment 1 of the present invention.

Embodiments of a display screen generation apparatus according to the present invention will be described hereinafter referring to drawings. In the drawings to be referred to below, the same or equivalent portions are denoted by the same reference numeral. Note that the present invention is not limited by the embodiments.

Embodiment 1

FIG. 1 is a configuration diagram illustrating an example of an FA system in Embodiment 1 of the present invention. In FIG. 1, an FA system 100 is provided with a display screen generation apparatus 101, a programmable logic controller (PLC) 102, equipments 103 (103a to 103f), and transmission lines 104. The FA system 100 is constituted of two equipment networks, that is, a network formed of the PLC 102 and the equipments 103a to 103c, and a network formed of the PLC 102 and the equipments 103d to 103f Although an example is described in which the FA system 100 is provided with six equipments 103, the number of equipments 103 is not limited to this. The FA system 100 may be provided with an arbitrary number of equipments 103.

The display screen generation apparatus 101 is an apparatus that generates a display screen for the FA system 100, and displays the generated display screen on a display unit such as a monitor.

The PLC 102 is a controller that controls the equipments 103. The PLC 102 is connected to the display screen generation apparatus 101 and the equipments 103 and outputs input values coming from the equipments 103 to the display screen generation apparatus 101.

Each equipment 103 is an apparatus that carries out processing in accordance with an instruction from the PLC 102 and outputs status information on the status of the running processing and an execution result being a result of the processing, to the PLC 102 as an output value. Each equipment 103 is a generally employed processing equipment such as a servo, a servo amplifier, and a processing robot. Each equipment 103 is provided with an input unit such as a switch and a sensor and outputs an input value expressing a status and obtained from the input unit, to the PLC 102.

The transmission lines 104 are transmission lines that connect the display screen generation apparatus 101 and the PLC 102 to each other, and the PLC 102 and the equipments 103 to each other. The transmission lines 104 are wire cables such as coaxial cables and optical cables. The apparatuses connected via the transmission lines 104 can transmit and receive data to and from each other. Referring to FIG. 1, the connection between the display screen generation apparatus 101 and the PLC 102, and the connection between the PLC 102 and the equipments 103 are each described as wire connection using the transmission lines 104. However, the connection may be wireless connection using Wi-Fi (registered trademark) or the like.

Referring to FIG. 1, a case has been described where the network constituted of the equipments 103a to 103c together with the PLC 102, and the network constituted of the equipments 103d to 103d together with the equipments 103 are different networks. However, the network configuration is not limited to this. The PLC 102 and the equipments 103 may constitute a single network, or three or more networks.

Figure 2:
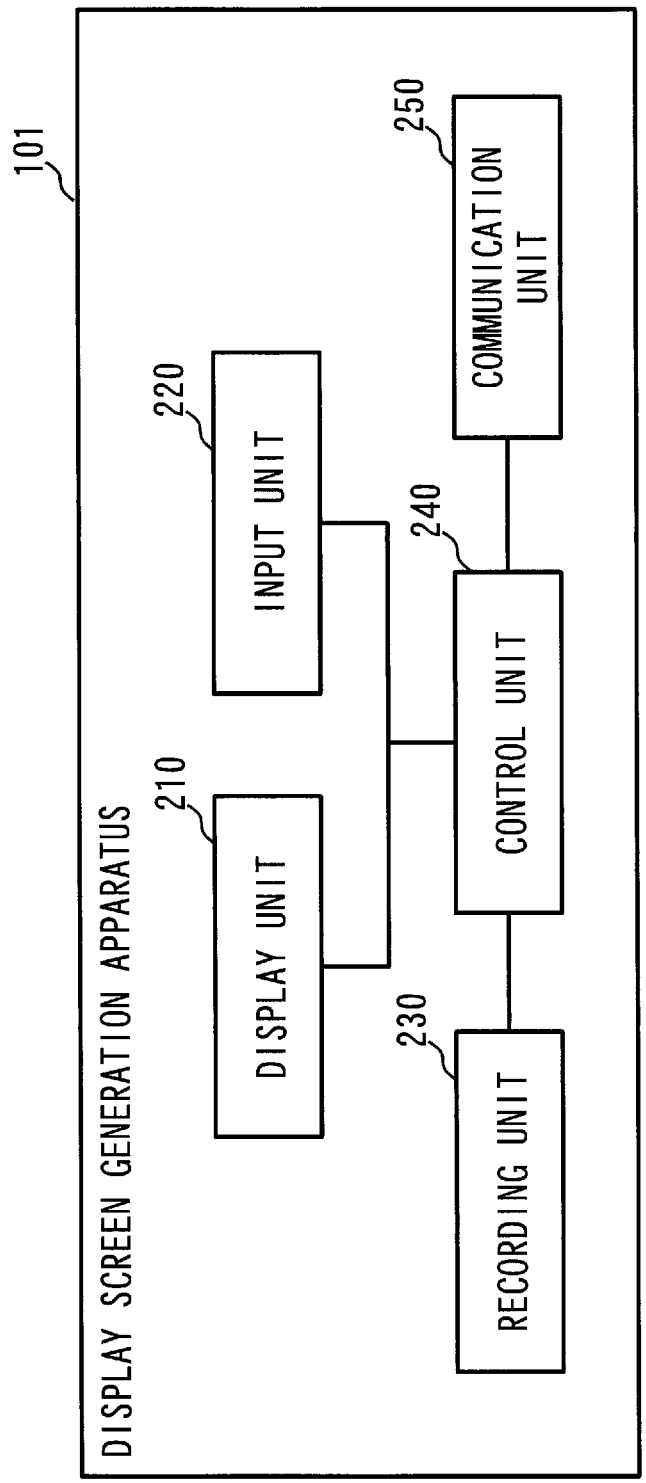
FIG. 2 is a structural diagram illustrating an example of a display screen generation apparatus in Embodiment 1 of the present invention.

A hardware structure of the display screen generation apparatus 101 will now be described referring to FIG. 2. FIG. 2 is a structural diagram illustrating an example of the display screen generation apparatus in Embodiment 1 of the present invention. In FIG. 2, the display screen generation apparatus 101 is provided with a display unit 210, an input unit 220, a recording unit 230, a control unit 240, and a communication unit 250. The display unit 210 displays a screen of a monitor or the like. The input unit 220 accepts input from a user via a keyboard, a touch panel, or the like. The recording unit 230 records information. The control unit 240 controls display in the display unit 210. The communication unit 250 executes communication with the PLC 102.

The recording unit 230 records a control program accessed by the control unit 240, and various types of databases. Note that the recording unit 230 is a non-volatile memory such as a flash memory, a read only memory (ROM), a magnetic disk, and an optical disk; or a volatile memory such as a random access memory (RAM).

The control unit 240 controls display in the display unit 210 based on the input value from the input unit 220, the control program and data base recorded in the recording unit 230, and an input value inputted from the PLC 102 via the communication unit 250. How display in the display unit 210 is carried out will be described later in detail. The control unit 240 may be a processor such as a central processing unit (CPU), or an electronic circuit such as a field programmable gate array (FPGA) and large scale integration (LSI).

The communication unit 250 is constituted of a receiver which receives data and a transmitter which transmits data. The communication unit 250 is, for example, a communication chip or a network interface card (NIC).

Figure 3:
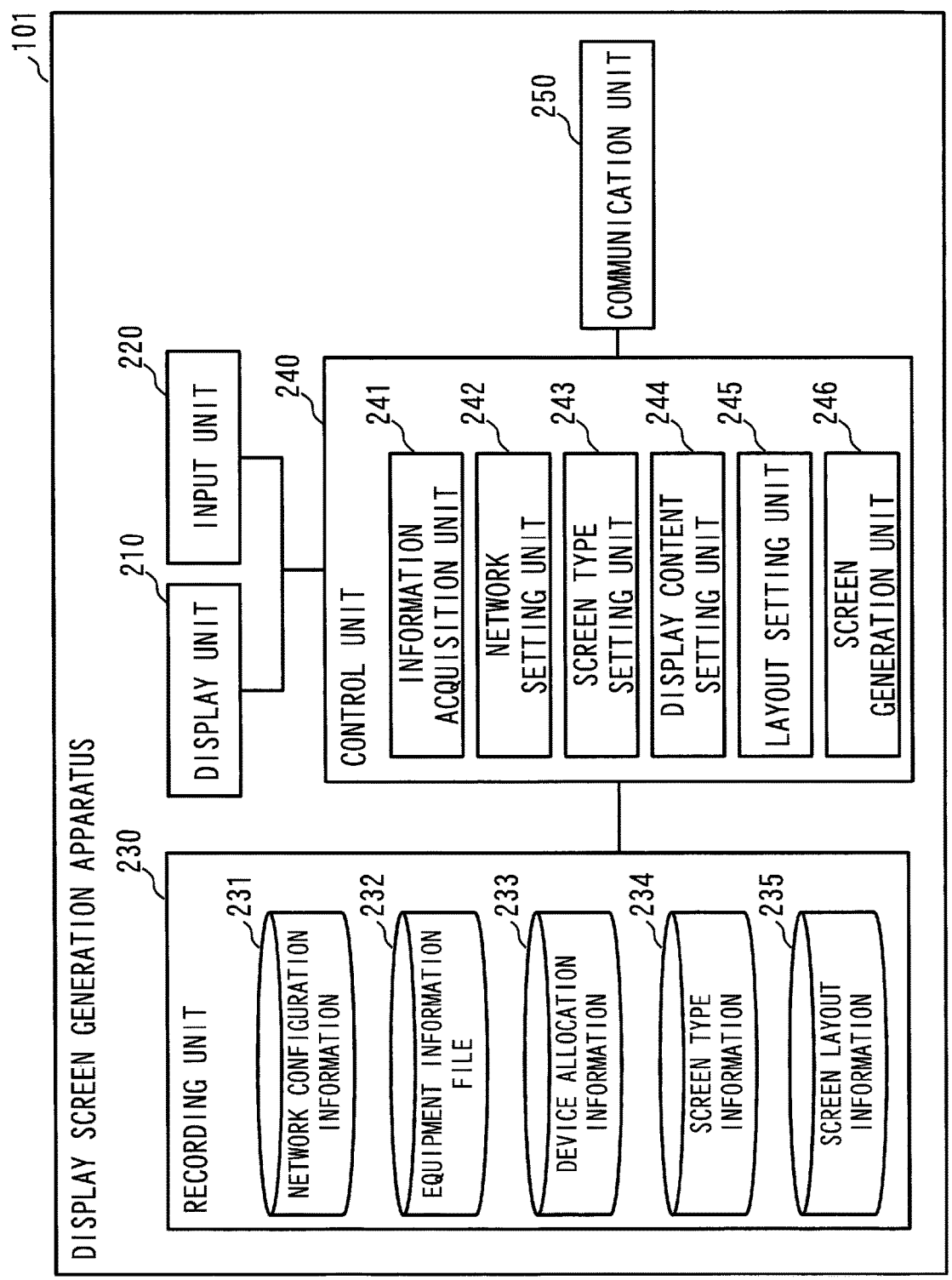
FIG. 3 is a configuration diagram illustrating an example of a functional configuration of the display screen generation apparatus in Embodiment 1 of the present invention.

A functional configuration of each of the recording unit 230 and the control unit 240 in the display screen generation apparatus 101 will be described referring to FIG. 3. FIG. 3 is a configuration diagram illustrating an example of the functional configuration of the display screen generation apparatus in Embodiment 1 of the present invention. The display unit 210, input unit 220, and communication unit 250 are similar to those in FIG. 2 and accordingly their description will be omitted.

Referring to FIG. 3, the recording unit 230 possesses network configuration information 231, an equipment information file 232, device allocation information 233, screen type information 234, and screen layout information 235. Each of the network configuration information 231, the equipment information file 232, and the device allocation information 233 is information on equipments, which is information other than the screen configuration information. Each of the screen type information 234 and the screen layout information 235 is screen configuration information.

The network configuration information 231 is information indicating network configurations of the PLC 102 and equipments 103 in the FA system 100.

The equipment information file 232 is information including input/output information on input to the equipments 103 and on output from the equipments 103, equipment information such as spec information of the equipments 103, parameter information on preset parameters of the equipments 103, command information for executing processing operations by the equipments 103, and communication information on communication conditions of the equipments 103. The equipment information file 232 is equipment profile information described by CPS+ (control and communication system profile) or the like determined by CC-Link (registered trademark).

The device allocation information 233 is information indicating the allocating relation between devices of the PLC 102 and devices of the equipments 103. Here, a device refers to a coil, a contact, and so on in a ladder diagram employed for PLC control. For example, a device is a bit device whose value is either 0 or 1 only, or a word device whose value is a numerical value falling within a range of −32768 to 32767.

Each of the network configuration information 231, equipment information file 232, and device allocation information 233 is information which the display screen generation apparatus 101 can share with another apparatus, and is information generated in connection with an apparatus other than the display screen generation apparatus 101 when, for example, setting or operating an apparatus other than the display screen generation apparatus 101. For example, each of the network configuration information 231 and device allocation information 233 is preset information created when constructing a network between the PLC 102 and equipments 103. The equipment information file 232 is information created by an equipment dealer for each individual equipment 103, and can be acquired afterwards together with the equipments 103, or via the network. The network configuration information 231, the equipment information file 232, and the device allocation information 233 are recorded in the PLC 102 or a PCL operation apparatus that operates the PLC 102. By combining the network configuration information 231, equipment information file 232, and device allocation information 233, the PLC 102 accesses the devices of the equipments 103 and executes operating the equipments 103.

Hence, the information recorded in the recording unit 230 of the display screen generation apparatus 101 are the network configuration information 231, equipment information file 232, and device allocation information 233 which are already recorded by the PLC 102 or a PLC operating apparatus that operates the PLC 102, and are information to be shared with the PLC 102.

The network configuration information 231, equipment information file 232, and device allocation information 233 may be recorded in the recording unit 230 in accordance with any one of the followings. The user may manually copy the information recorded in the PLC 102 using a recording medium such as a digital versatile disk (DVD: registered trademark). The display screen generation apparatus 101 may automatically acquire the information from the PLC 102 or the PLC operating apparatus which operates PLC 102, via the communication unit 250. Alternatively, the display screen generation apparatus 101 may be provided with a function of the PLC operating apparatus, and may record information generated when creating an operation program for operating the PLC 102.

Back to FIG. 3, the screen type information 234 is information on a screen frame which presents a screen type and a screen configuration corresponding to the screen type. The screen type indicates a type of a display screen for each equipment 103 displayed on the display unit 210. The screen type includes, for example, an input/output information screen which displays input/output information of the equipment 103, an operation information screen which displays operation information as to whether the operation status of the equipment 103 is normal or abnormal, and a command display screen which displays a command to execute an operation for the equipment 103. The screen type is created arbitrarily in accordance with the type of the equipment 103 or in response to a request of the user.

Figure 4C:
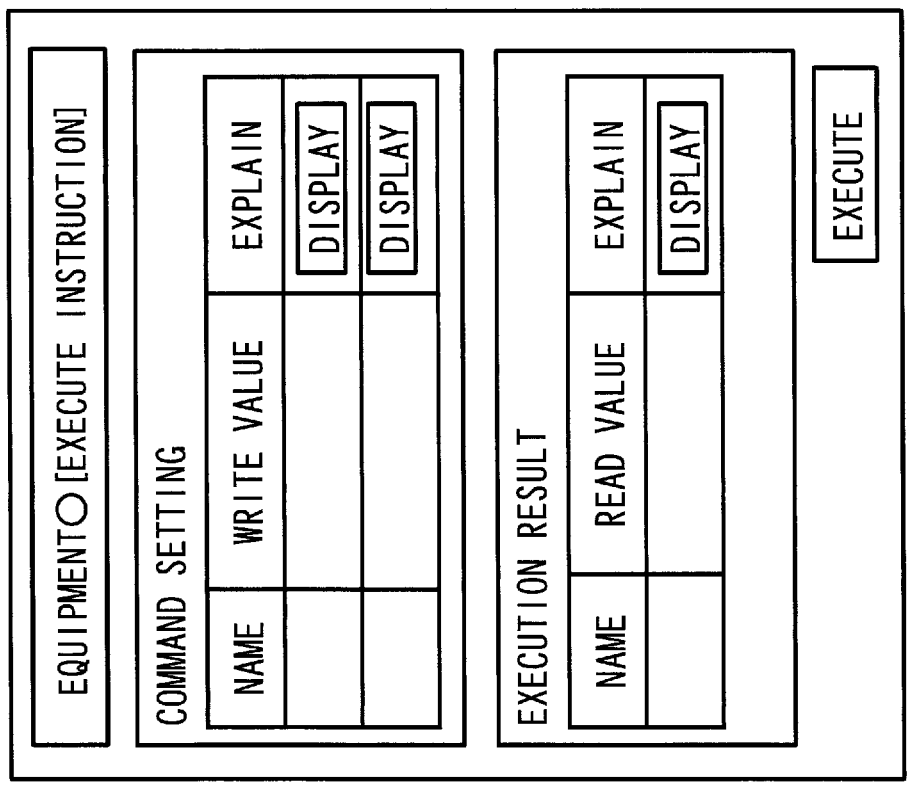

FIGS. 4A, 4B, and 4C present explanatory diagrams each illustrating an example of a screen frame corresponding to a screen type in Embodiment 1 of the present invention. FIG. 4A indicates a screen frame of the input/output information screen for displaying the input/output information. FIG. 4B indicates a screen frame of the operation information screen for displaying the operation information. FIG. 4C indicates a screen frame of the command display screen for displaying a command.

The screen frame of the input/output screen illustrated in FIG. 4A is a screen frame in which: a displayed equipment 103 is indicated on the upper left; and an item name to be displayed and a present value being present input/output information are indicated in the form of a table so as to be correlated with each other. As the item name to be displayed, the name of a device having an input/output value in the equipment 103, the name being acquired from the equipment information file 232, or the input/output item names is displayed. As the present value, the input/output information of the equipment 103, which is acquired from the PLC 102 via the communication unit 250, is displayed. The display screen generation apparatus 101 acquires the input/output information of the equipment 103 from the PLC 102 as follows. The displayed item name is linked to allocation information acquired from the device allocation information 233. The linked allocation information is transmitted from the display screen generation apparatus 101 to the PLC 102 via the communication unit 250. The PLC 102 acquires the present value in accordance with the transmitted information and outputs the acquired present value to the display screen generation apparatus 101. The display screen generation apparatus 101 acquires the present value via the communication unit 250.

The screen frame of the operation information screen illustrated in FIG. 4B is a screen frame in which: the displayed equipment 103 is indicated on the upper left; and a code being an error code and an error name corresponding to the code are indicated in the form of a table so as to be correlated with each other. As the code to be displayed, an error code of an error occurring in the equipment 103, which is acquired from the PLC 102 via the communication unit 250, is displayed. As the error name, the error name of the equipment 103, which is acquired from the equipment information file 232, is displayed. The display screen generation apparatus 101 acquires the error code of the equipment 103 from the PLC 102 as follows. The display screen generation apparatus 101 transmits an instruction to the PLC 102 via the communication unit 250 so as to transmit an occurring error code. The PLC 102 acquires the error code in accordance with the transmitted instruction and outputs the acquired error code to the display screen generation apparatus 101. The display screen generation apparatus 101 acquires the error code via the communication unit 250. The screen frame of the operation information screen illustrated in FIG. 4B is also provided with an explanation button and an information update button. The explanation button is used to make a transition to an error detail screen listing details of the error content acquired from the equipment information file 232. The information update button is used to update the operation information. With this configuration, confirmation of the error details and update of the operation information can be performed easily. On the screen frame of the operation information screen illustrated in FIG. 4B, when the information update button is depressed, the displayed code is updated with a code of the present time of the equipment 103, which is acquired from the PLC 102 via the communication unit 250.

The screen frame of the command display screen indicated in FIG. 4C is a screen frame in which the displayed equipment 103 is indicated on the upper left, a command setting area is indicated on the upper part, and an execution result area is indicated on the lower part. The command setting area indicates the name and write value of the command to be set, in the form of a table so as to be correlated to each other. The execution result area indicates the name and read value of an execution result, being an execution result of the preset command, in the form of a table so as to be correlated to each other. As the name of the command, a name acquired from the equipment information file 232 or an input value entered by the user via the input unit 220 is displayed. As the name of the execution result, a name acquired from the equipment information file 232 is displayed. As the write value, an input value entered by the user via the input unit 220 is displayed. As the read value, a read value of the execution result in the displayed equipment 103, which is obtained when processing is executed under a condition indicated in the command setting area, is acquired from the PLC 102 via the communication unit 250, and the acquired read value is displayed. The input value to be entered by the user via the input unit 220 may be either the name of the command, or the command itself.

The screen frame of the command display screen indicated in FIG. 4C is provided with an explanation button to make a transition to a command detail screen or an execution result detail screen, and an execution button to execute processing of a command being set. The command detail screen lists details of a command acquired from the equipment information file 232. The execution result detail screen lists details of the execution result. This configuration facilitates detailing of the command, detailing of the execution result, and processing of the preset command easily.

On the screen frame of the command display screen illustrated in FIG. 4C, when the execution button is depressed, a name and read value of the displayed execution result are updated with a name and read value of an execution result obtained when processing is executed under a condition which is acquired from the PLC 102 via the communication unit 250 and which is displayed in a command setting area. More specifically, the displayed command name is linked to allocation information acquired from the device allocation information 233. When the user enters a write value of the command via the input unit 220 and depresses the execution button, a command corresponding to the name of the command whose write value has been entered, the entered write value, and the linked allocation information are transmitted from the display screen generation apparatus 101 to the PLC 102 via the communication unit 250. The PLC 102 executes processing in accordance with the transmitted information. After that, the PLC 102 outputs the execution result to the display screen generation apparatus 101. The display screen generation apparatus 101 acquires the execution result via the communication unit 250.

Back to FIG. 3, the screen layout information 235 is information indicating a screen layout concerning an arrangement of a screen frame corresponding to an on-screen screen type of the display screen displayed on the display unit 210.

Figure 5A:
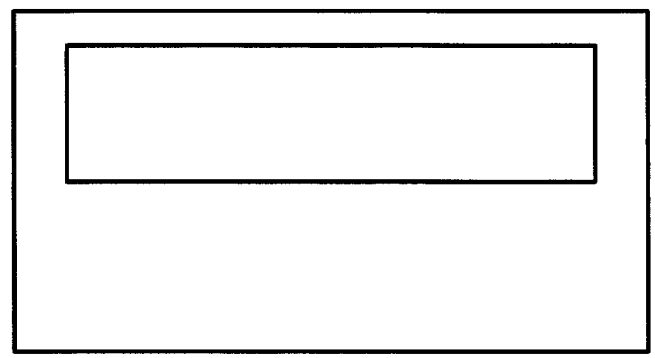
FIGS. 5A and 5B present explanatory drawings each illustrating an example of a screen layout in Embodiment 1 of the present invention.
Figure 5B:
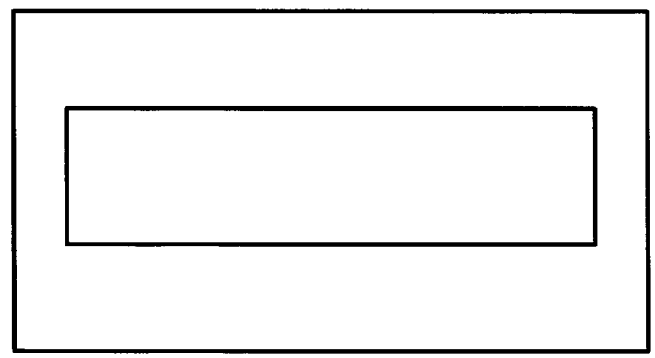

FIGS. 5A and 5B present explanatory drawings each illustrating an example of a screen layout in Embodiment 1 of the present invention. FIG. 5A indicates a screen layout in which one screen frame is arranged on an upper part. FIG. 5B indicates a screen layout in which one screen frame is arranged at the center.

Back to FIG. 3, the control unit 240 is provided with an information acquisition unit 241, a network setting unit 242, a screen type setting unit 243, a display content setting unit 244, a layout setting unit 245, and a screen generation unit 246. The information acquisition unit 241 acquires the network configuration information 231, equipment information file 232, device allocation information 233, screen type information 234, and screen layout information 235 from the recording unit 230. The information acquisition unit 241 also acquires information related to the equipments 103 from the PLC 102 via the communication unit 250. The information related to the equipments 103 is, for example, an input/output value being an input value and output value of the equipments 103, an error code of an error occurring in the equipments 103, and the read value of the execution result obtained when the command is executed by the equipments 103.

The network setting unit 242 sets a target network being a target of a display screen which is to be generated in accordance with the network configuration information 231 acquired from the information acquisition unit 241 and the input value entered via the input unit 220. How the network setting unit 242 sets the target network will be described later in detail.

The screen type setting unit 243 sets a screen type of a display screen which is to be generated in accordance with the screen type information 234 acquired by the information acquisition unit 241 and an input value entered via the input unit 220. How the screen type setting unit 243 sets the screen type will be described later in detail.

The display content setting unit 244 sets display content in accordance with the network configuration information 231, equipment information file 232, and device allocation information 233 which are acquired by the information acquisition unit 241, and in accordance with the input value entered via the input unit 220. Note that the each individual item as the display content is information created based on the network configuration information 231, equipment information file 232, and device allocation information 233 which are recorded in the recording unit 230. How the display content setting unit 244 sets a display content will be described later in detail.

The layout setting unit 245 sets the screen layout in accordance with the screen layout information 235 acquired by the information acquisition unit 241, and the input value entered via the input unit 220. How the layout setting unit 245 sets the screen layout will be described later in detail.

The screen generation unit 246 generates the screen in accordance with the network, the screen type, the display content, and the screen layout which are set respectively by the network setting unit 242, the screen type setting unit 243, the display content setting unit 244, and the layout setting unit 245. How the screen generation unit 246 generates the screen will be described later in detail.

Figure 6:
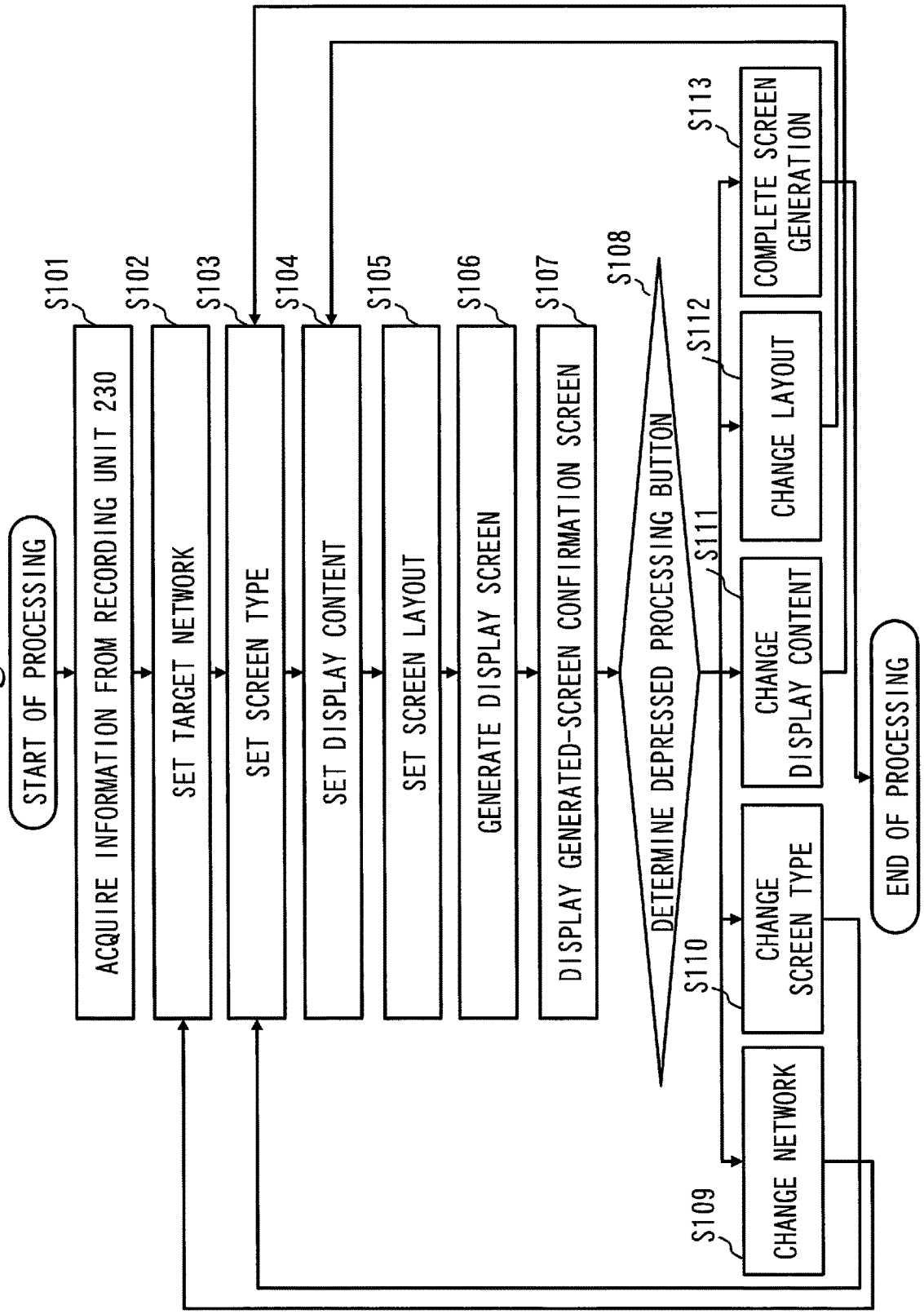
FIG. 6 is a flowchart illustrating an example of a flow of display screen generation processing in Embodiment 1 of the present invention.

A flow of the screen generation processing in the control unit 240 will now be described referring to FIG. 6. FIG. 6 is a flowchart illustrating an example of a flow of the display screen generation processing in Embodiment 1 of the present invention.

First, the user starts the processing by requesting start of automatic screen generation processing. The user may request start of the processing in an arbitrary manner. For example, a screen generation button may be provided as the input unit 220, and the user may depress the screen generation button. Alternatively, the screen displayed by the display unit 210 may have screen generation buttons as the input unit 220, and the user may select a corresponding button.

In step S101, the information acquisition unit 241 acquires the network configuration information 231, equipment information file 232, device allocation information 233, screen type information 234, and screen layout information 235 from the recording unit 230.

In step S102, the network setting unit 242 sets a target network. More specifically, the network setting unit 242 extracts network information included in the acquired network configuration information 231, and displays the extracted network information on the display unit 210 as a list of a target candidate. The user selects a target network for which a display screen is to be generated, via the input unit 220. For the sake of descriptive convenience, in the following description, assume that the network setting unit 242 selects in step S102 a network in which the equipments 103a to 103c are connected, as the target network.

Subsequently, in step S103, the screen type setting unit 243 sets a screen type of the display screen to be generated. More specifically, the screen type setting unit 243 displays a list of a screen frame corresponding to the screen type illustrated in FIGS. 4A, 4B, and 4C and acquired from the screen type information 234 of the recording unit 230, on the display unit 210. The screen type setting unit 243 sets a screen type corresponding to the screen frame selected by the user via the input unit 220, as the screen type for which a display screen is to be generated.

Figure 7A:
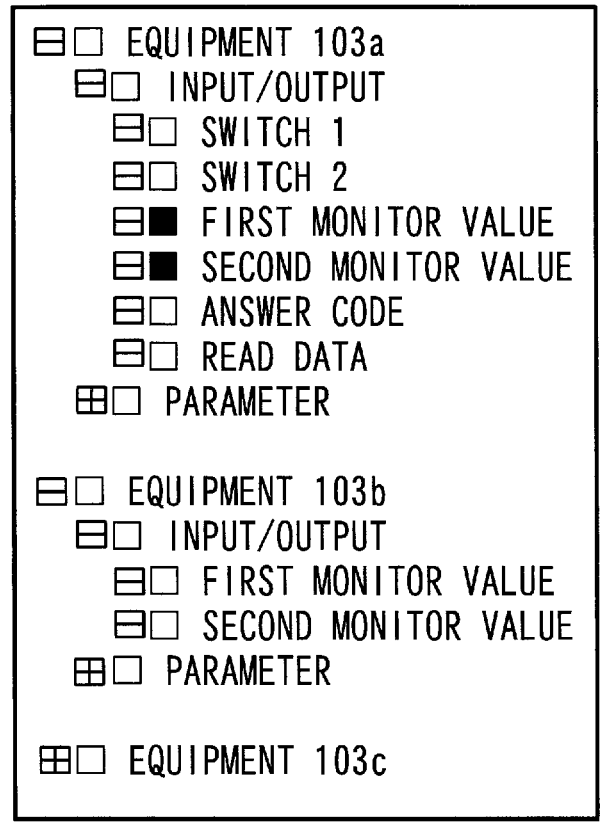
FIGS. 7A, 7B, and 7C present explanatory diagrams each illustrating an example of a display content setting screen in Embodiment 1 of the present invention.
Figure 7B:
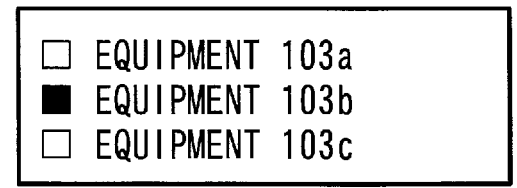
Figure 7C:
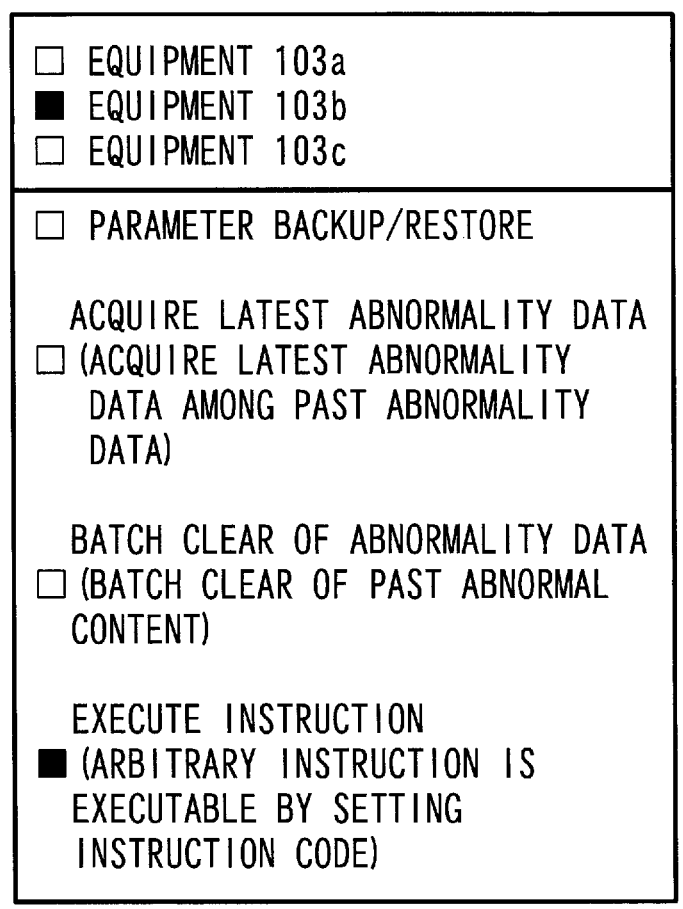

In step S104, the display content setting unit 244 sets display content of the display screen which is to be generated in accordance with the screen type being set in step S103. More specifically, in accordance with the screen type which is set by the screen type setting unit 243, the display content setting unit 244 displays a display content setting screen having: a candidate list of a display item as a candidate; and a selecting portion, on the display unit 210. The display item is the candidate to be displayed based on information acquired from the network configuration information 231, equipment information file 232, or device allocation information 233. The selecting portion selects whether each display item is to be set or not. The display content setting unit 244 sets a display item selected by the user via the input unit 220 as the display content. FIGS. 7A, 7B, and 7C present explanatory diagrams each illustrating an example of the display content setting screen in Embodiment 1 of the present invention. FIG. 7A indicates a display content setting screen of a case where the screen type is an input/output information screen. FIG. 7B indicates a display content setting screen of a case where the screen type is an operation information screen. FIG. 7C indicates a display content setting screen of a case where the screen type is a command display screen.

FIG. 7A indicates a display content setting screen displaying the candidate list of the display item including input/output information of the equipments 103a to 103c. This screen displays the device name and input/output values of each equipment 103 as display item candidates. Note that the device name and input/output values of each displayed equipment 103 are information acquired from the equipment information file 232, and are linked to the allocation information which are acquired from the device allocation information 233 as device allocation information of the corresponding PLC 102 and equipment 103. In FIG. 7A, each symbol expressed as "plus" in a square represents a further expandable display item, and each symbol expressed as "minus" in a square represents an already expanded display item. Each symbol expressed as a white square (□) and each symbol expressed as a black square (■), which are correlated to corresponding display items, are selecting portions. Each white square indicates that it is not selected, and each black square indicates that it is selected. FIG. 7A indicates that the first monitor value and second monitor value of the equipment 103a are selected as the display content. The first monitor value and second monitor value of the equipment 103a appear as the item names on the screen frame of the input/output information screen illustrated in FIG. 4A.

FIG. 7B indicates a display content setting screen where selection from among the equipments 103a to 103c can be made. This display content setting screen displays equipments 103 which are candidates of the display item displaying the operation status. The displayed equipments 103 are equipments 103 included in the target network which is acquired from the network configuration information 231 and which is set by the network setting unit 242 in step S102. In the display content setting screen of FIG. 7B as well, selecting portions are displayed to be correlated with corresponding display items, in the same manner as in FIG. 7A.

FIG. 7C indicates a display content setting screen where an equipment selection area for making selection from among the equipments 103a to 103c is indicated on the upper part and a command selection area for selecting a command to operate is indicated on the lower part. The equipment selection area indicates equipments 103 to be operated, which are also candidates of the display item. The command selection area indicates candidates of a command to operate, which are also candidates of the display item. The command information acquired from the equipment information file 232 is displayed as a candidate of the command to operate and is linked to the allocation information acquired from the device allocation information 233 as the device allocation information of the corresponding PLC 102 and equipment 103.

The command selection area displayed on the lower part may change its display depending on the equipment 103 selected in the equipment selection area on the upper part. FIG. 7C indicates a case where an equipment selection area and a command selection area are displayed on one screen. Alternatively, an equipment selection area and a command selection area may be formed as separate screens. When an equipment 103 is selected, transition to a command-selection display content setting screen having a command selection area may occur.

Figure 8:
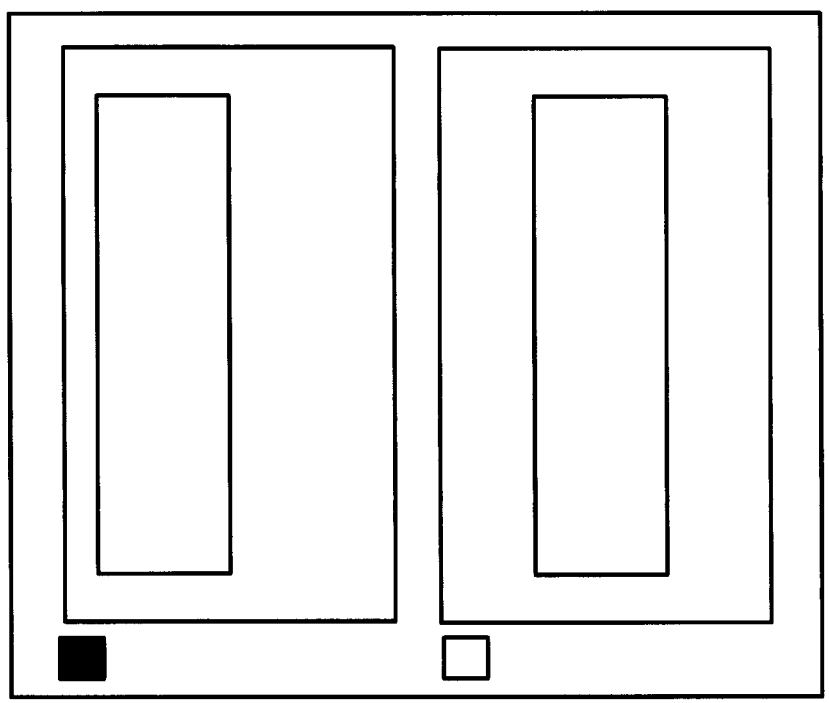
FIG. 8 is an explanatory diagram illustrating an example of a layout setting screen in Embodiment 1 of the present invention.

Back to FIG. 6, In step S105, the layout setting unit 245 sets a screen layout. More specifically, the layout setting unit 245 displays, on the display unit 210, a layout setting screen displaying a list of screen layouts which is acquired from the screen layout information 235 and indicated in FIGS. 5A and 5B. The layout selected by the user via the input unit 220 is set as the screen layout. FIG. 8 is an explanatory diagram illustrating an example of a layout setting screen in Embodiment 1 of the present invention. FIG. 8 indicates a screen where the screen layouts indicated in FIGS. 5A and 5B are arranged vertically. A selecting portion indicating a selection status of the screen layout is indicated on the upper left of each screen. A white square (□) indicates that it is not selected, and a black square (■) indicates that it is selected. FIG. 6 describes a case where two screen layouts are selectable. Note that the number of selectable screen layouts is not limited two. Three or more screen layouts may be selected.

Once the screen layout is set, the determined screen layout is not changed often after that. Therefore, in step S105, information which is set when this step is carried out may be recorded in the recording unit 230. Then, in the next processing and beyond, step S105 may be omitted.

In step S106, the screen generation unit 246 generates the screen in accordance with the network, the screen type, the display content, and the screen layout which are set by the network setting unit 242, the screen type setting unit 243, the display content setting unit 244, and the layout setting unit 245, respectively. More specifically, the screen generation unit 246 generates the screen by arranging a screen frame corresponding to the screen type which is set in accordance with the preset screen layout, and by displaying the preset display content corresponding to the display items of the arranged screen frame. The display screen to be generated changes greatly depending on the preset screen type. Therefore, a case where the preset screen type is an input/output information screen, a case where the preset screen type is an operation information screen, and a case where the preset screen type is a command display screen will be described referring to FIGS. 9A, 9B, and 9C, FIGS. 10A, 10B, and 10C, and FIGS. 11A, 11B, and 11C, respectively.

Figure 9A:
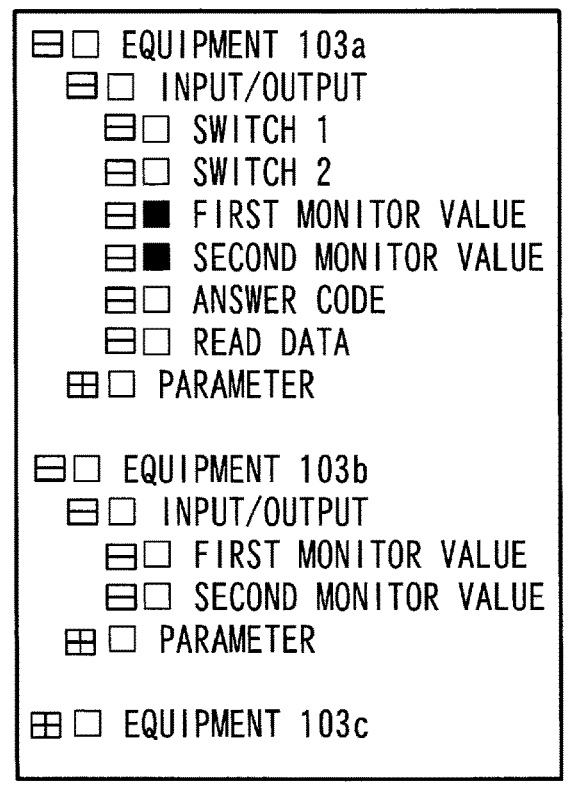
Figure 9B:
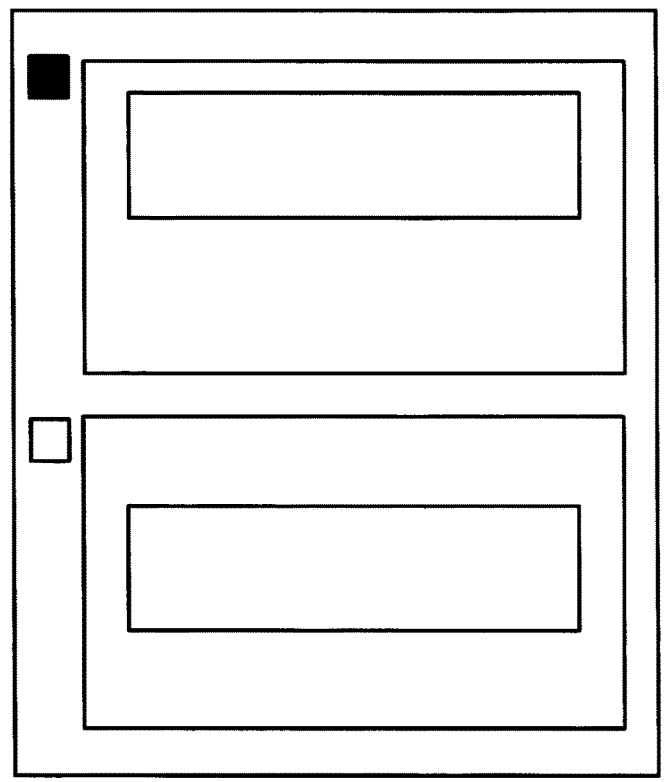

FIGS. 9A, 9B, and 9C present explanatory diagrams each illustrating an example of a display screen of a case in Embodiment 1 of the present invention where the screen type is an input/output information screen. FIG. 9A indicates a selection status of display content of the display content setting screen. FIG. 9B indicates a selection status of a screen layout on a layout setting screen. FIG. 9C indicates a display screen generated by the screen generation unit 246 when the display content and the screen layout are set as in FIG. 9A and FIG. 9B.

FIG. 9A indicates a display content setting screen of a case where the screen type is an input/output information screen, and indicates that out of the display item list acquired from the equipment information file 232, the first monitor value and second monitor value of the equipment 103a are set as the display content. FIG. 9B indicates a layout setting screen where only one screen type is arranged, and indicates that a screen layout displaying the screen type on its upper part is set. FIG. 9C indicates a display screen generated by the screen generation unit 246 in accordance with the first monitor value and second monitor value of the equipment 103a and the screen layout, which are the display content being set as in FIG. 9A and FIG. 9B. Present value 120 of the first monitor value and present value 200 of the second monitor value are the present value of the first monitor value and the present value of the second monitor value, respectively, of the equipment 103a which are acquired by the information acquisition unit 241 from the PLC 102 via the communication unit 250. More specifically, based on an instruction of the screen generation unit 246, the information acquisition unit 241 transmits the device allocation information 233 linked to the displayed item names to the PLC 102 via the communication unit 250. The PLC 102 acquires the present value of the first monitor value and the present value of the second monitor value in accordance with the transmitted information, and outputs the acquired present values to the display screen generation apparatus 101. The information acquisition unit 241 acquires the present values via the communication unit 250.

Figure 10A:
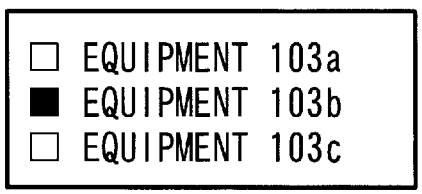
Figure 10B:
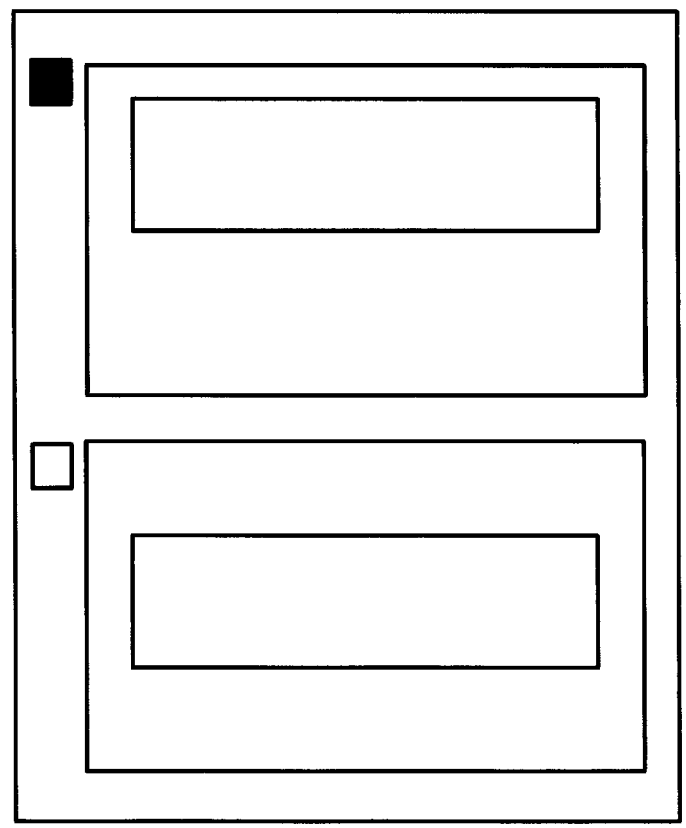

FIGS. 10A, 10B, and 10C present explanatory diagrams each illustrating an example of a display screen of a case in Embodiment 1 of the present invention where the screen type is an operation information screen. FIG. 10A indicates a selection status of display content of the display content setting screen. FIG. 10B indicates a selection status of a screen layout on the layout setting screen. FIG. 10C indicates a display screen generated by the screen generation unit 246 when the display content and the screen layout are set as in FIG. 10A and FIG. 10B.

FIG. 10A indicates a display content setting screen of a case where the screen type is an operation information screen, and indicates that the equipment 103b is set as an equipment to display the operation information, from the list of the equipments 103 included in the target network which is acquired from the network configuration information 231 and which is set by the network setting unit 242. FIG. 10B indicates a layout setting screen where only one screen type is arranged, and indicates that a screen layout that displays the screen type on the upper part is set. FIG. 10C indicates a display screen generated by the screen generation unit 246 in accordance with a code being an error code of an error occurring in the equipment 103b, an error name corresponding to the error code acquired from the equipment information file 232, and the screen layout, which are the display content being set as in FIG. 10A FIG. 10B. The error code of the error occurring in the equipment 103b is acquired by the information acquisition unit 241 from the PLC 102 via the communication unit 250. More specifically, based on an instruction of the screen generation unit 246, the information acquisition unit 241 transmits an instruction to transmit an error code occurring in the PLC 102 via the communication unit 250. The PLC 102 acquires the error code in accordance with the transmitted instruction and outputs the acquired error code to the display screen generation apparatus 101. The information acquisition unit 241 acquires the error code via the communication unit 250.

Figure 11A:
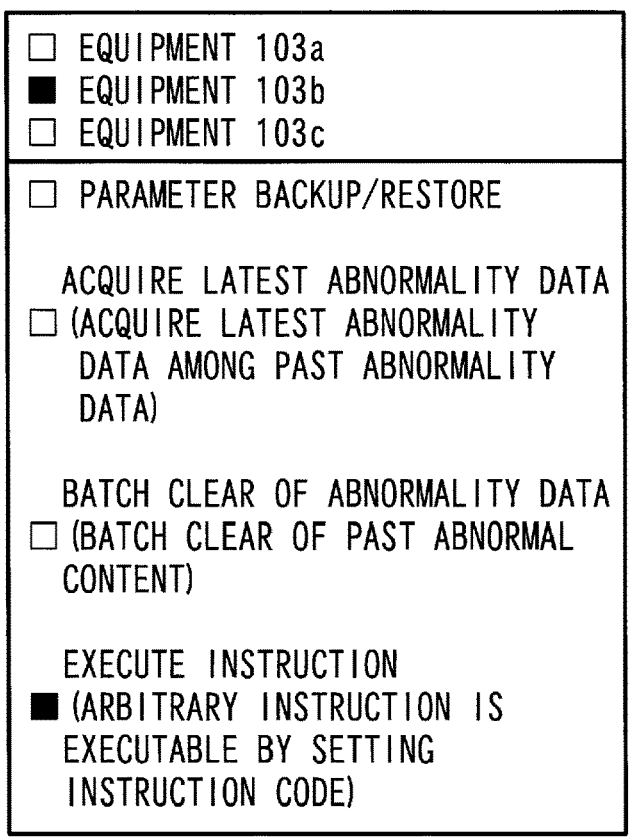
FIGS. 11A, 11B, and 11C present explanatory diagrams each illustrating an example of a display screen of a case in Embodiment 1 of the present invention where the screen type is a command display screen.
Figure 11B:
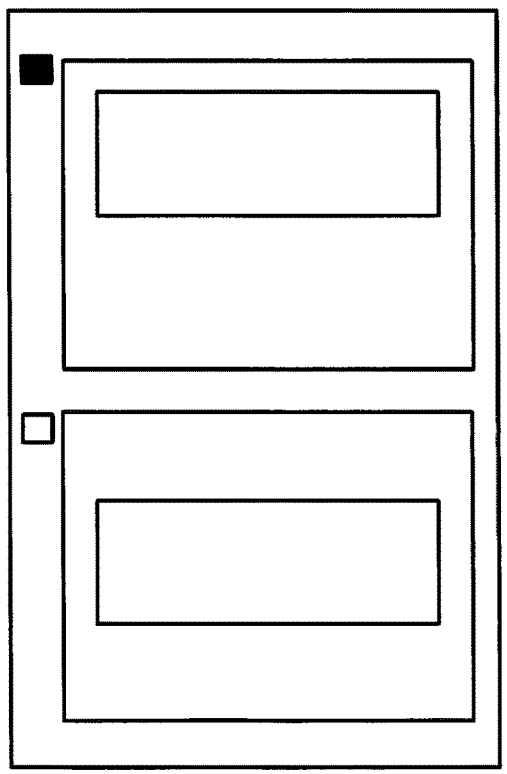
Figure 11C:
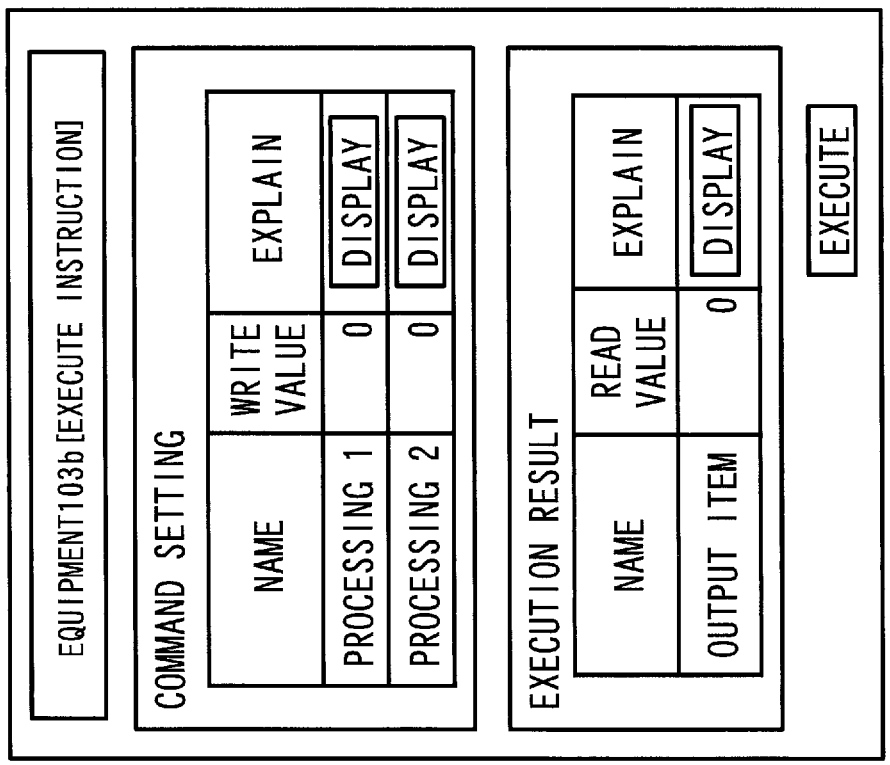

FIGS. 11A, 11B, and 11C present explanatory diagrams each illustrating an example of a display screen of a case in Embodiment 1 of the present invention where the screen type is a command display screen. FIG. 11A indicates a selection status of the display content on the display content setting screen. FIG. 11B indicates a selection status of a screen layout on the layout setting screen. FIG. 11C indicates a display screen which is generated by the screen generation unit 246 when the display content and the screen layout are set as in FIG. 11A and FIG. 11B.

FIG. 11A indicates a display content setting screen of a case where the screen type is a command display screen, and indicates that the equipment 103*b* is selected as an equipment to operate, out of the list of the equipments 103 included in the target network which is acquired from the network configuration information 231 and which is set by the network setting unit 242, and that an instruction execution is selected as a command to operate from the candidate list of the commands to operate which are acquired from the equipment information file 232. FIG. 11B indicates a layout setting screen where only one screen type is arranged, and indicates that a screen layout displaying the screen type on the upper part is set. FIG. 11C indicates a display screen generated by the screen generation unit 246 in accordance with the command being the display content which is set in FIG. 11A, an execution result as a result of executing the command, and a screen layout which is set in FIG. 11B. In FIG. 11C, the name of the command corresponding to the preset command, and the name of an output item of the execution result are information acquired from the equipment information file 232. A write value, being a preset value for processing execution of the preset command by the equipment 103*b*, is an input value which the user enters via the input unit 220. A read value which is an output value of the execution result, being the result of executing the preset command by the equipment 103*b*, is acquired by the information acquisition unit 241 from the PLC 102 via the communication unit 250.

How a read value is acquired will be described specifically. The name of the displayed command is linked to the allocation information acquired from the device allocation information 233. Assume that the user enters the write value of the command via the input unit 220 and depresses the execution button. Then, based on the instruction of the screen generation unit 246, the information acquisition unit 241 transmits a command corresponding to the name of the command for which the write value has been entered, the entered write value, and the linked allocation information to the PLC 102 via the communication unit 250. The PLC 102 executes processing in accordance with the transmitted information. After that, the PLC 102 outputs the execution result to the display screen generation apparatus 101. The information acquisition unit 241 acquires the execution result via the communication unit 250.

Back to FIG. 6, in step S107, the screen generation unit 246 generates a confirmation screen for the user to confirm the generated screen, and displays the generated confirmation screen to the display unit 210. FIG. 12 is an explanatory diagram illustrating an example of the confirmation screen in Embodiment 1 of the present invention. Note that FIG. 12 indicates a confirmation screen of a case where the screen type is an input/output information screen. When the screen type is an operation information screen, the confirmation screen is the same as that of a case where the screen type is an input/output information screen, except that the screen type to be displayed is an operation information screen. Accordingly, a description of the confirmation screen will omitted. When the screen type is a command display screen, the confirmation screen is the same as that of a case where the screen type is an input/output information screen, except that the screen type to be displayed is a command display screen. Accordingly, a description of the confirmation screen will be omitted.

In FIG. 12, the confirmation screen is constituted of a generation screen generated by the screen generation unit 246, and five processing button which are a generation complete button, a network change button, a screen type change button, a display content change button, and a layout change button. The generation complete button is a processing button to instruct completion of screen generation. The network change button is a processing button to instruct change of the target network on the generation screen. The screen type change button is a processing button to instruct change of the screen type on the generation screen. The display content change button is a processing button to instruct change of the display content on the generation screen. The layout change button is a processing button to instruct change of the screen layout on the generation screen. Each processing button is a button to make a transition to corresponding processing when the button is depressed by the user via the input unit 220.

In step S108, the screen generation unit 246 determines which button is depressed by the user. When the network change button is depressed, the screen generation unit 246 makes a shift to step S109. When the screen type change button is depressed, the screen generation unit 246 makes a shift to step S110. When the display content change button is depressed, the screen generation unit 246 makes a shift to step S111. When the layout change button is depressed, the screen generation unit 246 makes a shift to step S112. When the screen generation complete button is depressed, the screen generation unit 246 makes a shift to step S113.

In step S109, the screen generation unit 246 determines that network change is instructed, and makes a shift to step S102.

In step S110, the screen generation unit 246 determines that screen type change is instructed, and makes a shift to step S103.

In step S111, the screen generation unit 246 determines that display content change is instructed, and makes a shift to step S104.

In step S112, the screen generation unit 246 determines that layout change is instructed, and makes a shift to step S105.

In step S113, the screen generation unit 246 determines that completion of screen generation is instructed, displays a generated display screen to the display unit 210, and terminates the processing.

As has been described above, with the display screen generation apparatus 101 of Embodiment 1, the display screen can be generated automatically based on the network configuration information 231, the equipment information file 232, and the device allocation information 233 which are generated when setting the PLC 102. This provides an effect that the display screen for the FA system 100 can be generated based on information shared with the PLC 102, as information concerning equipments which is information other than the screen configuration information.

Figure 13A:
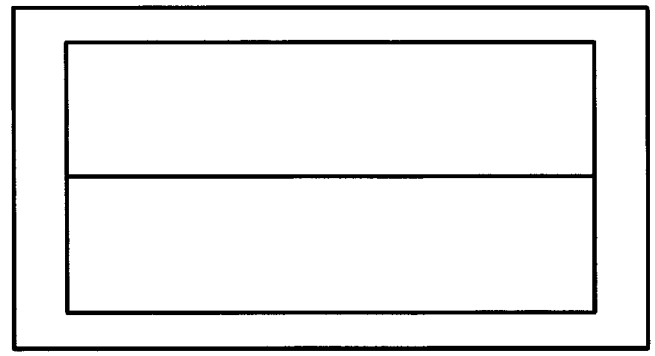
FIGS. 13A and 13B present explanatory diagrams each illustrating an example of a screen layout in Embodiment 1 of the present invention.
Figure 13B:
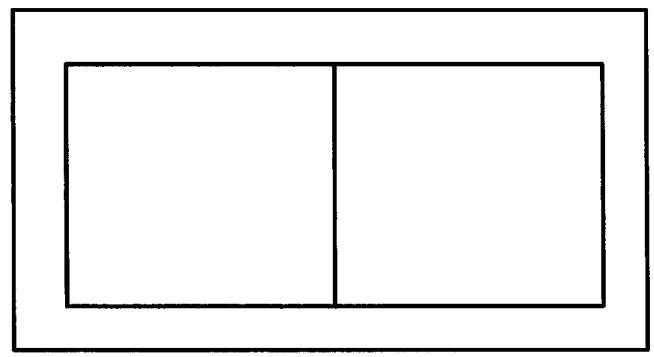

An example of the screen layout has been described in which only one screen frame corresponding to the screen type is arranged. However, the number of screen frames is not limited to one. Two or more screen frames may be arranged. FIGS. 13A and 13B present explanatory diagrams each illustrating an example of a screen layout in Embodiment 1 of the present invention. FIG. 13A indicates a screen layout of an arrangement in which two screen frames are arranged vertically. FIG. 13B indicates a screen layout of an arrangement in which two screen frames are arranged horizontally. FIGS. 13A and 13B present cases where the screen layout includes two screen frames. Note that the number of screen frames is not limited to two. Three or more screen frames may be arranged. In each screen layout of FIGS. 13A and 13B, the screen frames are adjacent. However, the arrangement of the screen frames is not limited to arrangement of adjacent screen frames. Screen frames may be arranged separately, may be arranged to overlap partly, or may be arranged side by side left- or right-diagonally.

Figure 14A:
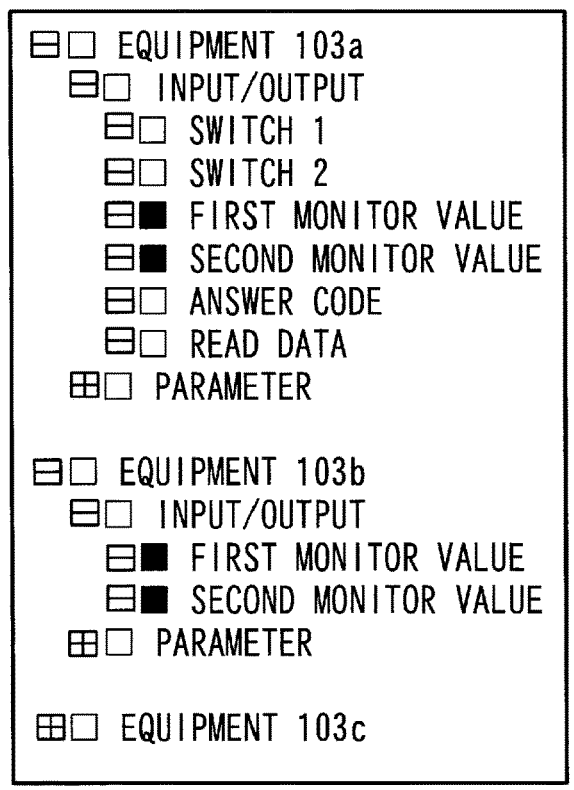
Figure 14B:
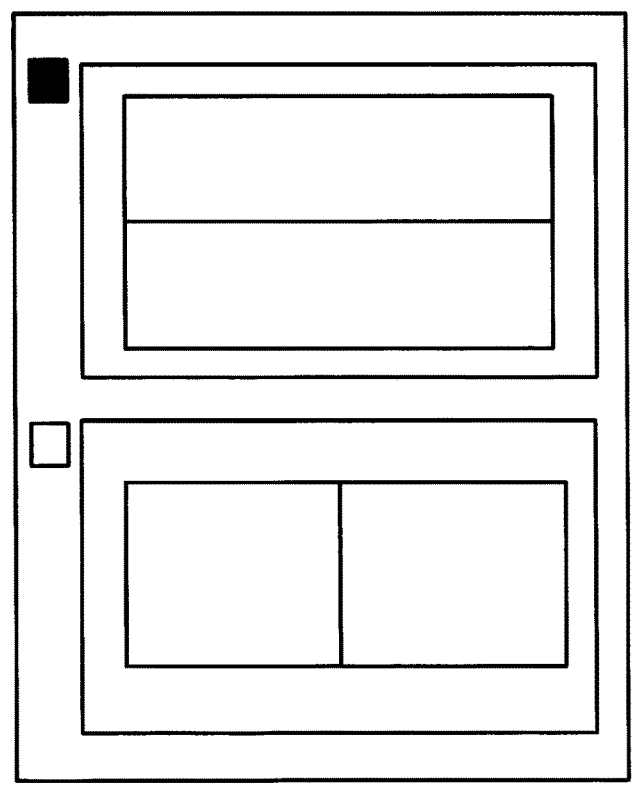

Referring to FIGS. 14A, 14B, and 14C, a description will now be made on display screens which are generated by the screen generation unit 246 when the screen layout includes two arranged screen frames corresponding to the screen types illustrated in FIGS. 13A and 13B. FIGS. 14A, 14B, and 14C present explanatory diagrams each illustrating an example of the display screen in Embodiment 1 of the present invention. FIG. 14A presents display screens of a case where the screen type is an input/output information screen. When the screen type is an operation information screen or a command display screen, the display screen is different from the display screens illustrated in FIGS. 10A, 10B, and 10C, and FIGS. 11A, 11B, and 11C. This is common to a case where the screen type is an input/output information screen, and accordingly its description will be omitted. FIG. 14A indicates a selection status of display content on the display content setting screen. FIG. 14B indicates a selection status of a screen layout on the layout setting screen. FIG. 14C indicates a display screen generated by the screen generation unit 246 when the display content and the screen layout are set as in FIG. 14A and FIG. 14B.

FIG. 14A indicates a display content setting screen of a case where the screen type is an input/output information screen, and indicates that the first monitor value and second monitor value of the equipment 103a and the first monitor value and second monitor value of the equipment 103b are set as the display content out of the display item list acquired from the equipment information file 232. FIG. 14B indicates a layout setting screen where two screen frames corresponding to the screen types are arranged, and indicates that a screen layout which displays two screen frames being arranged vertically is set. FIG. 14C indicates a display screen generated by the screen generation unit 246 in accordance with the first monitor value and second monitor value of the equipment 103a, the first monitor value and second monitor value of the equipment 103b, and the screen layout, which are the display content set in FIG. 14A and FIG. 14B. Present value 120 of the first monitor value and present value 200 of the second monitor value of the equipment 103a are the present value of the first monitor value and the present value of the second monitor value, respectively, of the equipment 103a, which are acquired by the information acquisition unit 241 from the PLC 102 via the communication unit 250. Present value 24 of the first monitor value and present value 888 of the second monitor value, of the equipments 103b are the present value, of the first monitor value and the present value of the second monitor value, respectively, of the equipment 103b, which are acquired by the information acquisition unit 241 from the PLC 102 via the communication unit 250. More specifically, based on an instruction of the screen generation unit 246, the information acquisition unit 241 transmits the device allocation information 233 linked to the displayed item names to the PLC 102 via the communication unit 250. The PLC 102 acquires the present value of the first monitor value and the present value of the second monitor value, of each of the equipments 103a and 103b in accordance with the transmitted information, and outputs the acquired present values to the display screen generation apparatus 101. The information acquisition unit 241 acquires the present values via the communication unit 250.

FIGS. 14A, 14B, and 14C present a case where the display screen generation apparatus 101 displays the display content setting screen, the layout setting screen, and the display screen as separate screens. How the display content setting screen, the layout setting screen, and the display screen are displayed is not limited to this. All of the display content setting screen, the layout setting screen, and the display screen may be displayed on the same screen. In that case, the display content setting screen, the layout setting screen, and the display screen are displayed side by side horizontally on one displayed screen, as indicated in, for example, FIGS. 9A, 9B, and 9C, FIGS. 10A, 10B, and 10C, FIGS. 11A, 11B, and 11C, and FIGS. 14A, 14B, and 14C.

Cases of Embodiment 1 have been described where the display screen generated by the display screen generation apparatus 101 is displayed on the display unit 210 of the display screen generation apparatus 101. However, the present invention is not limited to displaying the display screen on the display unit 210. The display screen may be displayed on a separate display that is different from the display screen generation apparatus 101.

A separate display 105 is provided with a recording unit formed of a display unit such as a monitor, and a non-volatile memory. The separate display 105 is connected to the display screen generation apparatus 101 via a transmission line. The display 105 receives data of a display screen generated by the display screen generation apparatus 101 via the transmission line, records data of the received display screen to the recording unit, and displays the display screen on the display unit based on the data of the recorded display screen. Connection between the display screen generation apparatus 101 and the separate display is not limited to wired connection using a transmission line. Wireless connection using Wi-Fi (registered trademark) may be employed. Alternatively, the separate display may be provided with an input unit, and the display 105 and the PLC 102 may be connected by wired connection using a transmission line or by Wi-Fi (registered trademark). Then, the user may enter an instruction to a display screen displayed on the display unit via the input unit, thereby instructing the PLC 102 to perform the processing. The display unit of the separate display may be a display unit having a touch panel, and the display unit may have a function of an input unit as well.

Embodiment 2

In Embodiment 1, an embodiment has been described in which each time the screen generation unit 246 generates a display screen, a target network, a screen type, display content, and a screen layout must be set by the network setting unit 242, the screen type setting unit 243, the display content setting unit 244, and the layout setting unit 245, respectively. In Embodiment 2, an embodiment will be described in which a screen generation unit 246 generates a display screen in accordance with preset information. A configuration of an FA system 100 and a structure of a display screen generation apparatus 101 are similar to those of Embodiment 1, and their description will accordingly be omitted.

Figure 15:
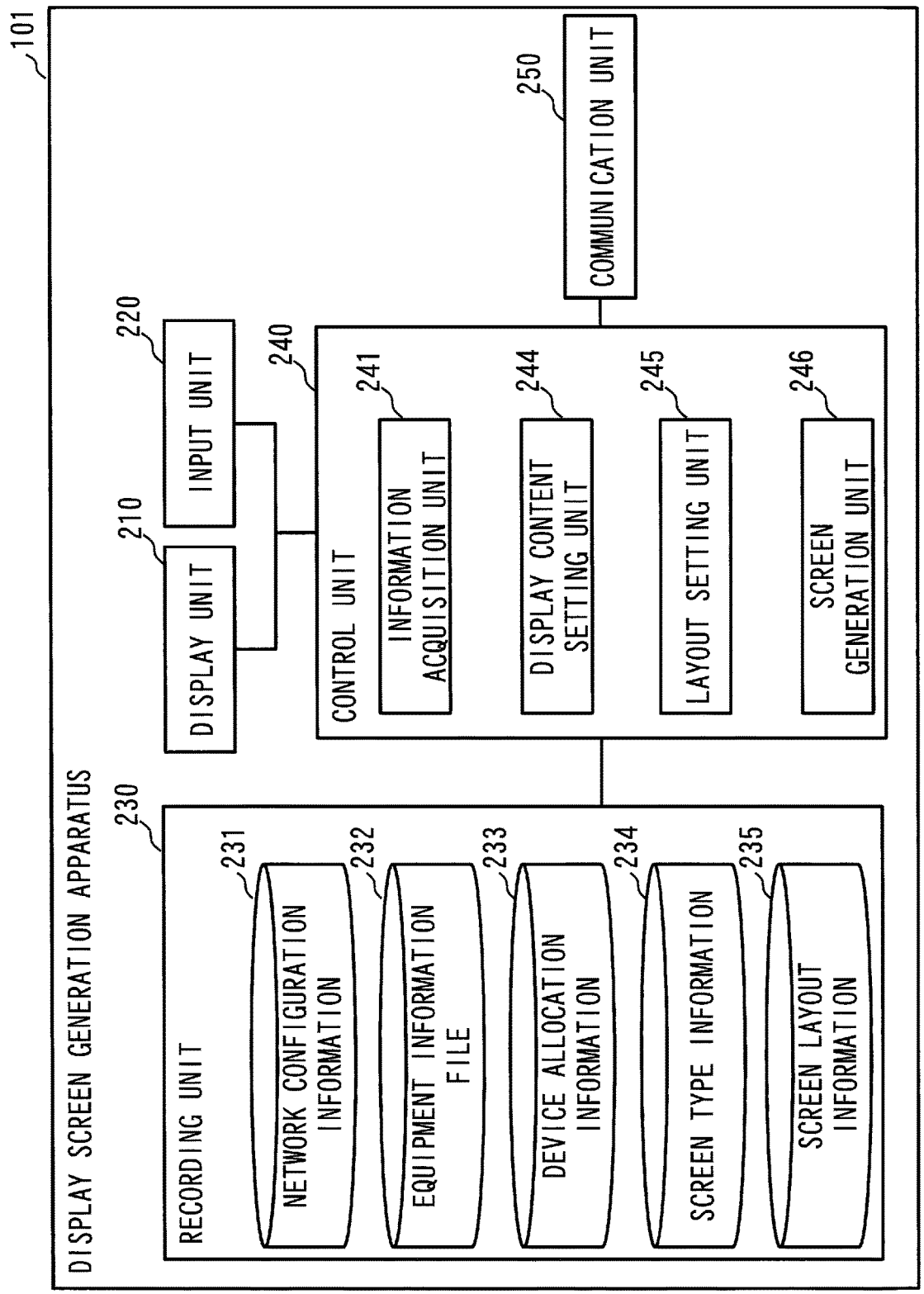
FIG. 15 is a configuration diagram illustrating an example of a functional configuration of a display screen generation apparatus in Embodiment 2 of the present invention.

FIG. 15 is a configuration diagram illustrating an example of a functional configuration of a display screen generation apparatus in Embodiment 2 of the present invention. The display screen generation apparatus in Embodiment 2 is different from the display screen generation apparatus 101 in Embodiment 1 in that a network setting unit 242 and a screen type setting unit 243 are not provided. Network configuration information 231 recorded in a recording unit 230 includes a target network for generating a display screen. An equipment information file 232 recorded in the recording unit 230 includes display content for generating a display screen. Screen type information 234 recorded in the recording unit 230 includes a screen type and information on the screen layout, which are used for generating the display screen. The screen type information 234 is information generated when setting a PLC 102. The target network, the display content, the screen type, and the screen layout, which are used for generating the display screen, are also information generated when setting the PLC 102.

Figure 16:
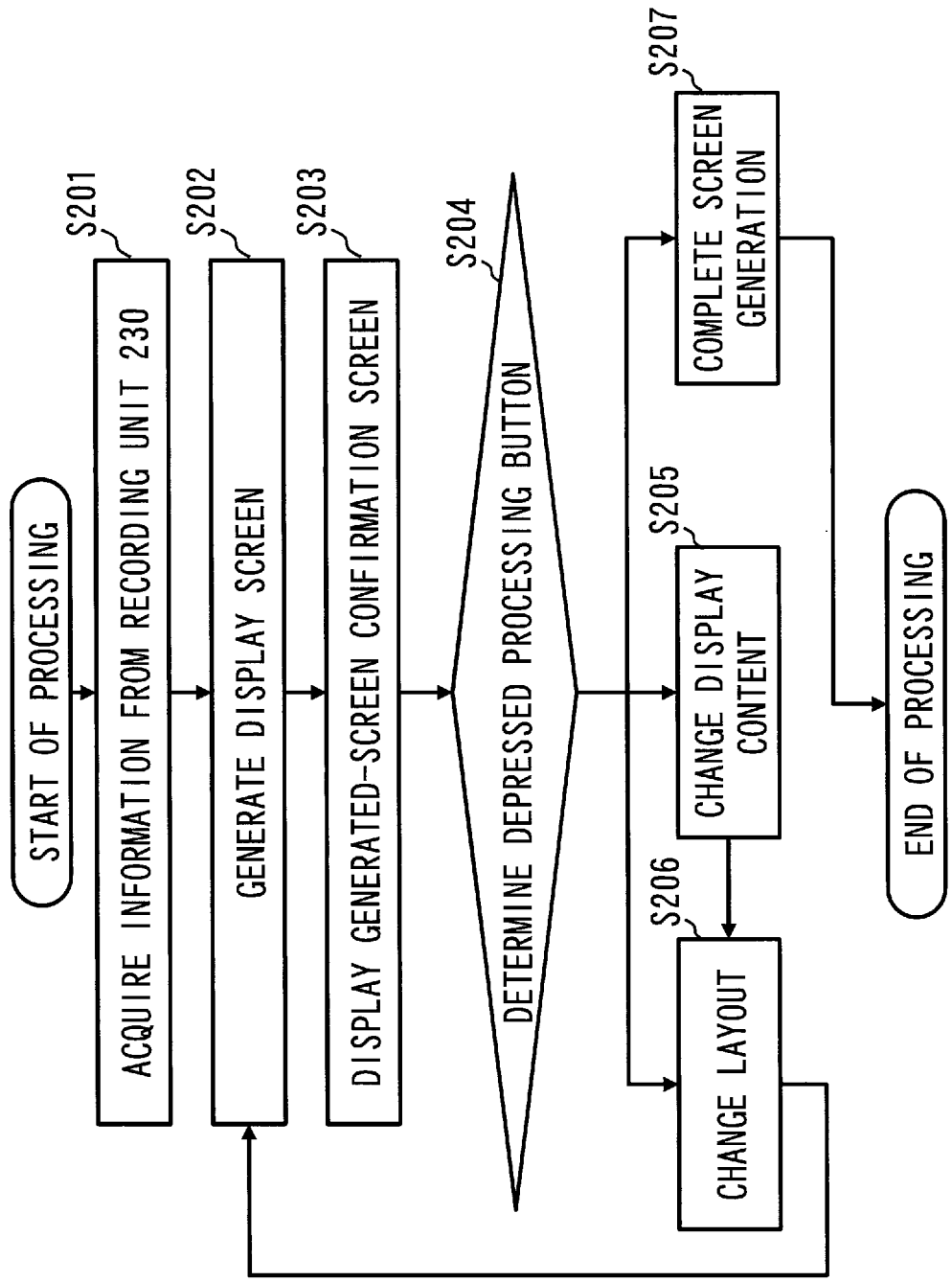
FIG. 16 is a flowchart illustrating an example of a flow of display screen generation processing in Embodiment 2 of the present invention.

Furthermore, an information acquisition unit 241 sets the target network, the screen type, the display content, and the screen layout in advance based on the information acquired form the recording unit 230. The other configurations are similar to those of Embodiment 1, and accordingly their detailed descriptions will be omitted FIG. 16 is a flowchart illustrating an example of a flow of display screen generation processing in Embodiment 2 of the present invention.

First, the user starts processing by requesting start of automatic image generation processing. In step S201, the information acquisition unit 241 acquires the network configuration information 231, equipment information file 232, device allocation information 233, and screen type information 234 from the recording unit 230, extracts a target network, a screen type, display content, and a screen layout from the acquired information, and sets the extracted information as information for generating a display screen.

In step S202, the screen generation unit 246 generates a screen based on the preset information for generating the display screen. The display screen generated by the screen generation unit 246 is similar to that of Embodiment 1, and accordingly its detailed description will be omitted.

In step S203, the screen generation unit 246 generates a confirmation screen for the user to confirm the generated screen, and displays the generated confirmation screen to the display unit 210. The only difference between the confirmation screen generated by the screen generation unit 246 and the confirmation screen of Embodiment 1 illustrated in FIG. 12 is that the confirmation screen of Embodiment 2 is not provided with the network change button and screen type change button of the confirmation screen of FIG. 12. Accordingly, a detailed description of the difference will be omitted.

In step S204, the screen generation unit 246 determines which button is depressed by the user. When the display content change button is depressed, the screen generation unit 246 makes a shift to step S205. When the layout change button is depressed, the screen generation unit 246 makes a shift to step S206. When the generation complete button is depressed, the screen generation unit 246 makes a shift to step S207.

In step S205, the screen generation unit 246 determines that display content change is instructed, and makes a transition to the display content setting screen illustrated in FIGS. 7A, 7B, and 7C. After that, the display content setting unit 244 sets the display content which is set by the user via the input unit 220, as the display content for generating the display screen, and makes a shift to step S206.

In step S206, when a shift from step S204 is made, the screen generation unit 246 determines that layout content change is instructed, and makes a transition to the layout setting screen illustrated in FIG. 8. When a shift is made from step S205, the display content setting unit 244 determines that layout content change is instructed, and makes a transition to the layout content setting screen illustrated in FIG. 8. After that, the layout setting unit 245 sets the screen layout which is set by the user via the input unit 220, as the screen layout for generating the display screen, and makes a shift to step S202.

In step S207, the screen generation unit 246 determines that completion of screen generation is instructed, displays a generated display screen to the display unit 210, and terminates the processing.

As has been described above, with the display screen generation apparatus 101 of Embodiment 2, the display screen is generated by setting in advance information for generating the display screen. This provides an effect that a step of setting information for generating the display screen can be omitted, so that development man-hours can be decreased to less than that in Embodiment 1.

Since a transition to the display content setting screen for changing the display content and a transition to the layout setting screen for changing the screen layout occur from the confirmation screen, information for generating a preset display screen can be changed. As a result, an effect can also be obtained that the display screen can be changed to meet the demands of the user.

A case has been described where the screen type and the screen layout, which are screen configuration information for generating a preset display screen, are generated when setting the PLC 102. However, how the screen type and the screen layout are generated is not limited to this. The screen type and the screen layout may be generated by the user at the time of initial setting of the display screen generation apparatus 101 and may be recorded in the recording unit 230. In this case, the user only needs to generate information for generating the display screen once. As a result, an effect can be obtained that information for generating a display screen need not be set each time the display screen is to be generated.

Embodiment 3

In Embodiment 1, an embodiment has been described in which each time the screen generation unit 246 generates a display screen, the display content must be set entirely. In Embodiment 3, an embodiment will be described in which: on the display content setting screen, setting of part of display content and setting of part of screen configuration information are fixed; and in the next processing and beyond, the fixed display content need not be set by individual setting units, but is displayed continuously on the display screen. A configuration of an FA system 100 and a structure of a display screen generation apparatus 101 are similar to those in Embodiment 1, and accordingly their detailed description will be omitted.

Figure 17:
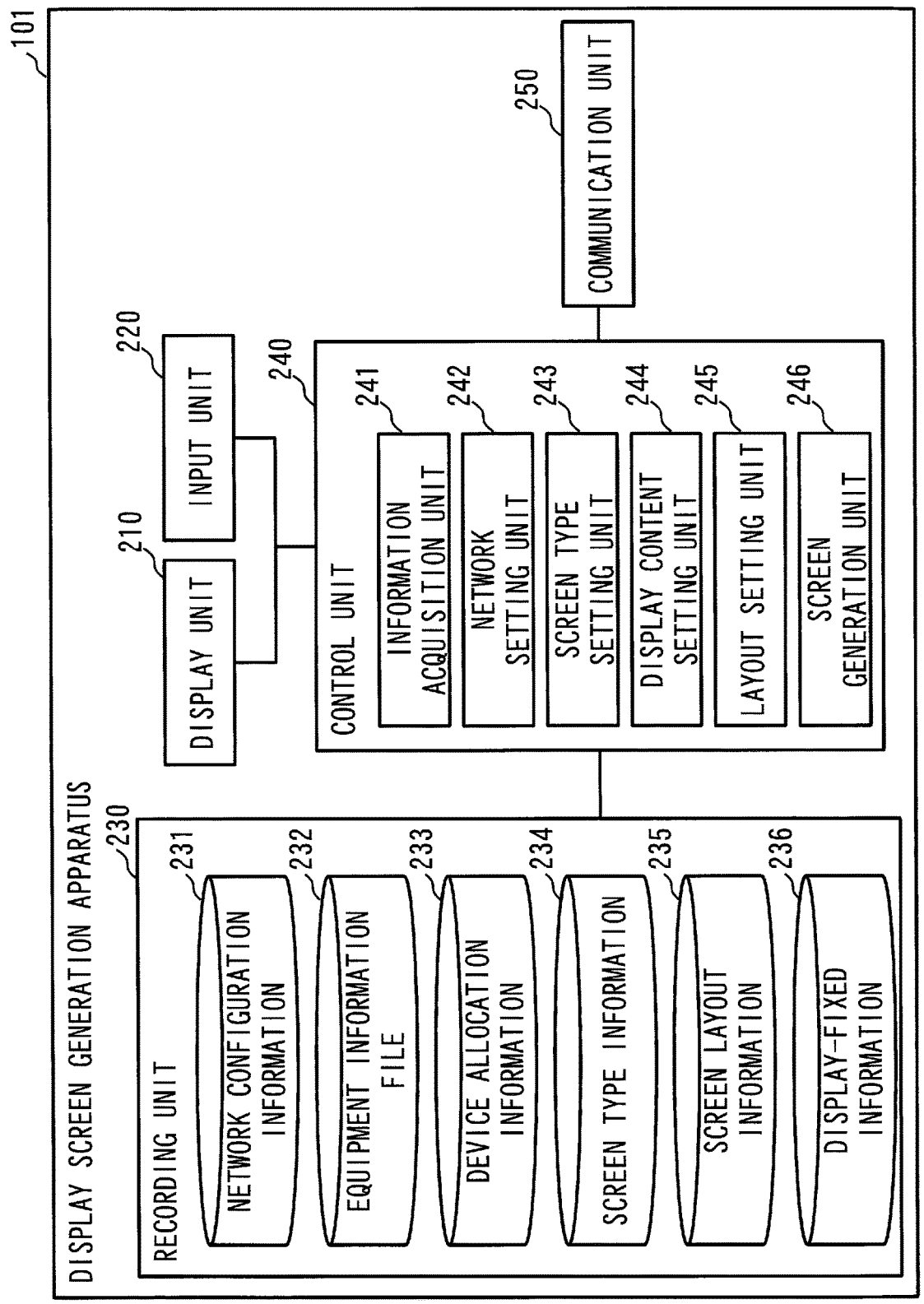
FIG. 17 is a configuration diagram illustrating an example of a functional configuration of a display screen generation apparatus in Embodiment 3 of the present invention.
Figure 18:
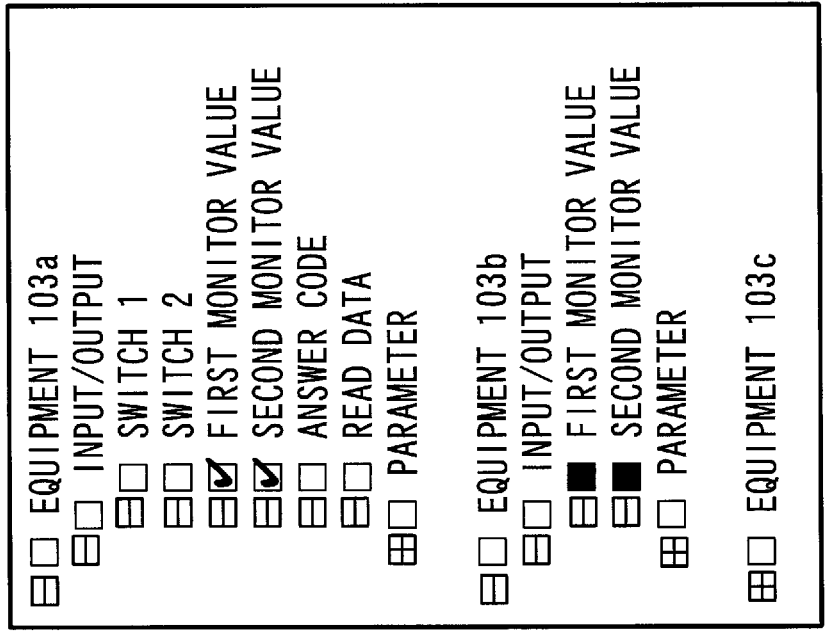
FIG. 18 is an explanatory diagram illustrating an example of a display content setting screen in Embodiment 3 of the present invention.

FIG. 17 is a configuration diagram illustrating an example of a functional configuration of a display screen generation apparatus in Embodiment 3 of the present invention. The difference from the display screen generation apparatus 101 of Embodiment 1 is that a recording unit 230 possesses a display-fixed information 236. The display-fixed information 236 is information indicating display content to be displayed continuously on the display screen. This information concerns the display content and screen configuration which are set fixedly. The display-fixed information 236 is screen configuration information, just like screen type information 234 and screen layout information 235 are. The other configurations are similar to those of Embodiment 1, and accordingly their detailed description will be omitted FIG. 18 is an explanatory diagram illustrating an example of a display content setting screen in Embodiment 3 of the present invention. FIG. 18 is a display content setting screen of a case where the screen type is an input/output information screen. When the screen type is an operation information screen, the display content setting screen is different from that of Embodiment 1 in the same respect with the case where the screen type is an input/output information screen, and accordingly a detailed description of the difference will be omitted. When the screen type is a command display screen, the display content setting screen is different from that of Embodiment 1 in the same respect with the case where the screen type is an input/output information, and accordingly a detailed description of the difference will be omitted.

FIG. 18 indicates a display content setting screen displaying a list of a display item having input/output information of the equipments 103a to 103c. Selecting portions corresponding to the first monitor value and second monitor value of the equipment 103a, and selecting portions corresponding to the first monitor value and second monitor value of the equipment 103b indicate that they are selected out of the display item list acquired from an equipment information file 232. The display content setting screen of FIG. 18 is different from the display content setting screen of Embodiment 1 illustrated in FIG. 7 in that the selecting portions corresponding to the first monitor value and second monitor value of the equipment 103a are expressed as check marks indicating that they are fixed, instead of black squares (■) indicating that they are selected. When a selecting portion is fixed, it means that the corresponding display item is a display item that will not be changed in the next processing and beyond. A selecting portion that is selected or fixed may be changed in an arbitrary manner. For example, a display content setting unit 244 may count the number of times the user has selected the selecting portion via an input unit 220, and may change the selecting portion depending on the counted number. The display content setting unit 244 records information of the display item that is fixed, to the display-fixed information 236.

FIGS. 19A and 19B present explanatory diagrams each illustrating an example of a display content setting screen in the second processing and beyond in Embodiment 3 of the present invention. FIGS. 19A and 19B are different from the content setting screen illustrated in FIG. 18 in that a display item in the content setting screen cannot be changed if it has been selected to indicate that it is fixed. FIG. 19A indicates a display content setting screen where a display item that has been selected to indicate that it is fixed is expressed in a different color. FIG. 19B indicates a display content setting screen where a display item that has been selected to indicate that it is fixed is expressed by presence or absence of a selecting portion. Each of FIG. 19A and FIG. 19B is provided with a reset button being a processing button, for canceling the fixed status. When the user depresses the preset button via the input unit 220, the display content setting unit 244 cancels a fixed status of a display item that has been selected to indicate that it is fixed, so that this display item becomes selectable.

How to fix a display position of a display item that has been selected to indicate that it is fixed, in a screen layout will also be described referring to FIG. 20. FIG. 20 is an explanatory drawing illustrating an example of a layout setting screen in Embodiment 3 of the present invention. FIG. 20 is different from the layout setting screen illustrated in Embodiment 1 in that screen frames corresponding to individual displayed screen types have selecting portions, respectively. FIG. 20 indicates that a screen frame corresponding to a check-marked selecting portion is selected.

In FIG. 20, the user can check-mark a selecting portion by depressing the selecting portion of each screen type via the input unit 220. The layout setting unit 245 is set such that a display item that has been selected to indicate that it is fixed is displayed at the position of a check-marked screen frame. When the layout setting unit 245 detects that the user has selected a screen type to be fixed, the layout setting unit 245 records the selected screen layout and the position of a check-marked screen frame to the display-fixed information 236, and makes this record to be reflected in the layout setting screen of the next processing and beyond.

As has been described above, with a display screen generation apparatus 101 of Embodiment 3, part of the once-fixed display content and part of the once-fixed screen configuration information are recorded as fixed setting, so that a step of resetting by the user in the next processing and beyond can be omitted. This provides an effect that development man-hours can be decreased to less than in Embodiment 1.

REFERENCE SIGNS LIST

100: FA system; 101: display screen generation apparatus; 102: PLC; 103: equipment; 104: transmission lines; 210: display unit; 220: input unit; 230: recording unit; 231: network configuration information; 232: equipment information file; 233: device allocation information; 234: screen type information; 235: screen layout information; 236: display-fixed information; 240: control unit; 241: information acquisition unit; 242: network setting unit; 243: screen type setting unit; 244: display content setting unit; 245: layout setting unit; 246: screen generation unit; 250: communication unit

The invention claimed is:

1. A display screen generation apparatus connected to a programmable logic controller (PLC) to which a plurality of equipment is connected, the display screen generation apparatus comprising
processing circuitry configured to
accept input from a user,
execute communication with the PLC,
perform an automated display screen generation process, the automated display screen generation process including
acquiring network configuration information, user equipment information file, and device allocation information, wherein the user equipment information file is created in advance by another device and the device allocation information concerning a device allocation of the plurality of equipment and the PLC and being created in advance by still another device that is different from the device having created the equipment information file,
extracting network information including the acquired network configuration information and displaying the extracted information as target network candidate list,
setting, in response to user selection of a target network candidate, a network configuration for a display screen to be generated,
displaying a list of candidate screen frames, each candidate screen frame corresponding to a different screen type, selected from an input/output type, an operation type, and a command type,
setting, in response to user selection of a candidate screen frame, a screen type, for the display screen to be generated, displaying, in accordance with the set screen type, a display content setting screen including a candidate list of display items based on the acquired equipment information file and tagged with allocation information acquired from the acquired device allocation information, where the candidate display items include candidate equipment which the user can select whether to include in the generated display screen, setting, in response to user selection of one or more selected candidate display items, display content for the display screen to be generated, displaying a layout setting screen including a candidate list of screen layouts corresponding to the set display items associated with the set display content, setting, in response to user selection of a candidate screen layout, a screen layout for the display screen to be generated, and generating the display screen by arranging a screen frame corresponding to the set screen type in accordance with the set screen layout, and displaying the set display content, generating and displaying a confirmation screen for the generated display screen, the confirmation screen comprising the generated display screen and a first button for allowing a user to confirm completion of the generated display screen and a plurality of second buttons for changing one or more set items including the set network, the set screen type, the set layout, and the set display content.

2. The display screen generation apparatus according to claim 1, wherein the screen layout is information concerning an arrangement of a screen frame corresponding to an on-screen screen type of the display screen.

3. A factory automation system comprising:
the display screen generation apparatus according to claim 2;
a display to display the display screen generated by the display screen generation apparatus;
a plurality of equipment; and
a PLC to which the plurality of equipment are connected.

4. The display screen generation apparatus according to claim 1, wherein the processing circuitry further displays the display content setting screen, the layout setting screen, and the display screen on one screen.

5. A factory automation system comprising:
the display screen generation apparatus according to claim 4;
a display to display the display screen generated by the display screen generation apparatus;
a plurality of equipment; and
a PLC to which the plurality of equipment are connected.

6. The display screen generation apparatus according to claim 1, wherein the processing circuitry further fixes setting of at least part of the display content based on the input information appearing on the display content setting screen, so that setting of display content which is set fixedly cannot be changed.

7. A factory automation system comprising:
the display screen generation apparatus according to claim 6;
a display to display the display screen generated by the display screen generation apparatus;
a plurality of equipment; and
a PLC to which the plurality of equipment are connected.

8. A factory automation system comprising:
the display screen generation apparatus according to claim 1;
a display to display the display screen generated by the display screen generation apparatus;
a plurality of equipment; and
a PLC to which the plurality of equipment are connected.

9. A display screen generation method of generating a display screen in a display apparatus connected to a programmable logic controller (PLC) to which a plurality of equipment are connected, the display screen generation method comprising:
an information acquisition step of acquiring an equipment information file and device allocation information, the equipment information file concerning the plurality of equipment and being created in advance by another device, the device allocation information concerning a device allocation of the plurality of equipment and the PLC and being created in advance by still another device that is different from the device having created the equipment information file; and performing an automated display screen generation process, the automated display screen generation process including
extracting network information including the acquired network configuration information and displaying the extracted information as target network candidate list;
setting, in response to user selection of a target network candidate, a network configuration for a display screen to be generated;
displaying a list of candidate screen frames, each candidate screen frame corresponding to a different screen type, selected from an input/output type, an operation type, and a command type;
setting, in response to user selection of a candidate screen frame, a screen type, for the display screen to be generated;
displaying, in accordance with the set screen type, a display content setting screen which displays a candidate list of display items based on the acquired equipment information file and tagged with allocation information acquired from the acquired device allocation information, where the candidate display items include candidate equipment which the user can select whether to include in the generated display screen;
setting, in response to user selection of one or more selected candidate display items, display content for the display screen to be generated;
displaying, a layout setting screen including a candidate list of screen layouts corresponding to the set display items associated with the set display content;
setting, in response to user selection of a candidate screen layout of the display screen, a screen layout for the display screen to be generated;
generating the display screen by arranging a screen frame corresponding to the set screen type in accordance with the set screen layout, and displaying the set display content; and
generating and displaying a confirmation screen for the generated display screen, the confirmation screen comprising the generated display screen and a first button for allowing a user to confirm completion of the generated display screen and a plurality of second buttons for changing one or more set items including the set network, the set screen type, the set layout, and the set display content.

\* \* \* \* \*